United States Patent
Kako et al.

(10) Patent No.: US 7,621,198 B2
(45) Date of Patent: Nov. 24, 2009

(54) SHIFT LEVER DEVICE

(75) Inventors: Kenichi Kako, Aichi-ken (JP); Noriyasu Shamoto, Aichi-ken (JP); Isamu Matsushima, Aichi-ken (JP); Keizo Fukuda, Aichi-ken (JP); Teruaki Kitano, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 733 days.

(21) Appl. No.: 10/915,371

(22) Filed: Aug. 11, 2004

(65) Prior Publication Data

US 2005/0039562 A1    Feb. 24, 2005

(30) Foreign Application Priority Data

Aug. 22, 2003  (JP)  ............................. 2003-208452
Aug. 26, 2003  (JP)  ............................. 2003-301385

(51) Int. Cl.
*G05G 1/04*    (2006.01)
*F16H 59/04*   (2006.01)
*B62D 1/06*    (2006.01)
*B60Q 1/00*    (2006.01)
*F16H 63/42*   (2006.01)

(52) U.S. Cl. ...................... 74/523; 74/473.3; 74/473.33; 74/473.37; 74/553; 74/557; 116/28.1; 340/456

(58) Field of Classification Search ................ 74/473.3, 74/473.33, 473.37, 557, 523, 553; 116/28.1; 340/456; *B60K 20/00, 20/02; G05G 1/04*
See application file for complete search history.

(56) References Cited

U.S. PATENT DOCUMENTS 4,991,535 A  *  2/1991  Kobayashi et al. .......... 116/28.1

(Continued)

FOREIGN PATENT DOCUMENTS

DE            34 05 688 A1  *  8/1985

(Continued)

OTHER PUBLICATIONS

PTO 14-0911, English Translation of JP 2002-25493, Nagasaka et al., Nov. 9, 2002.*

(Continued)

*Primary Examiner*—Vinh T. Luong
(74) *Attorney, Agent, or Firm*—Roberts Mlotkowski Safran & Cole, P.C.; Thomas W. Cole

(57) ABSTRACT

A shift lever device for operation of a transmission of a vehicle having a plurality of shift ranges is provided which includes a lever main body, a housing that movably supports the lever main body, a light source provided at one of the housing and the lever main body; a knob mounted to a distal end portion of the lever main body, and having a transmitting portion, a light guiding portion provided at the knob and guiding light from the light source to the interior of the knob, and a light guiding control portion. The light guiding control portion includes a shutter member operatively connected to and movable with the lever main body which, when the lever main body is positioned at least at one specific shift position, does not block light from the light source to the knob transmitting portion, and which, when the lever main body is positioned at a position other than the specific shift position, is moved to a position blocking the light to the knob transmitting portion.

12 Claims, 16 Drawing Sheets

U.S. PATENT DOCUMENTS

| | | | | |
|---|---|---|---|---|
| 5,159,892 | A | * | 11/1992 | Hara et al. .................. 116/28.1 |
| 5,900,678 | A | | 5/1999 | Rodgers |
| 5,979,263 | A | * | 11/1999 | Tomida et al. ............. 74/473.3 |
| 6,629,473 | B2 | * | 10/2003 | Syamoto et al. ................ 74/523 |
| 6,707,379 | B2 | * | 3/2004 | Nagasaka ................... 340/456 |

FOREIGN PATENT DOCUMENTS

| | | | |
|---|---|---|---|
| JP | 56-132136 U | | 10/1981 |
| JP | 58-129532 U | | 9/1983 |
| JP | 61-050835 | | 3/1986 |
| JP | 61-190619 | * | 8/1986 |
| JP | 7-13017 U | | 3/1995 |
| JP | 10-217796 A | | 8/1998 |
| JP | 11-34687 | * | 2/1999 |
| JP | 2000-29325 | * | 10/2000 |
| JP | 2002-254943 | | 9/2002 |
| JP | 2002-257236 | | 9/2002 |

OTHER PUBLICATIONS

PTO 14-0911, Translation of JP 2002-254943, Feb. 2008.*
Notification of the First Office Action dated May 26, 2006.
Office Action issued by Japanese Patent Office in corresponding Japanese Patent Application No. 2004-204680 dated Sep. 29, 2009.

* cited by examiner

F I G. 4
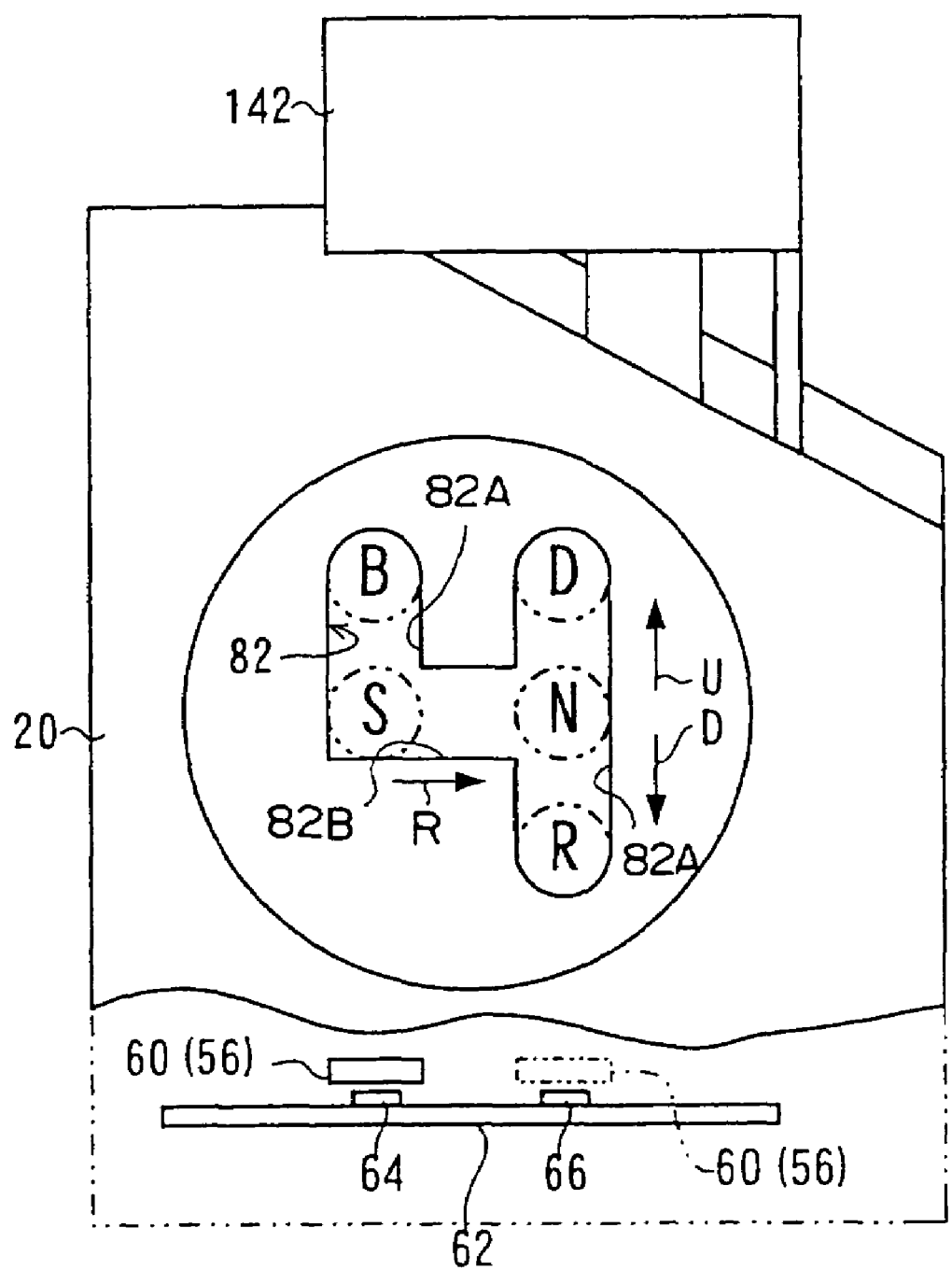

SHIFT LEVER DEVICE

CROSS-REFERENCE TO RELATED APPLICATIONS

The present application claims priority under 35 USC 119 on the basis of Japanese Patent Applications Nos. 2003-208452 and 2003-301385 the contents of which are incorporated by reference herein.

BACKGROUND OF THE INVENTION

1. Field of the Invention

The present invention relates to a shift lever device for operating a transmission of a vehicle.

2. Description of the Related Art

A shift lever device, which has a rod-shaped shift lever and operates an automatic transmission of a vehicle by turning the shift lever, is generally used in an operating device for operating the automatic transmission from the vehicle cabin so as to change the shift range set at the automatic transmission.

Among this type of shift lever device, there is, for example, a so-called straight shift lever device in which the axial direction is substantially the left-right direction of the vehicle, and which turns the shift lever device only around this axis (i.e., operates rectilinearly as seen in plan view). In addition, there is a so-called gate shift lever device in which the axial directions are respectively the substantially left-right direction of the vehicle and the substantially front-back direction of the vehicle, and which turns the shift lever in a zigzag manner around these axes.

In these shift lever devices, the shift pattern, which is the pattern of rotation of the shift lever, is set in advance. Further, plural shift positions are set within the range of this shift pattern. When the shift lever is shifted to a shift position corresponding to a desired shift range, the shift range of the automatic transmission is changed to the shift range corresponding to that shift position.

On the other hand, a structure has been conceived of in which such a shift pattern and shift positions are indicated, for example, on the knob of the shift lever, thereby facilitating confirmation of the shift pattern and the shift positions. Moreover, Japanese Patent Applications Laid-Open (JP-A) Nos. 61-50835 and 62-84809, among others, disclose a structure in which an illuminating means, such as a lamp or an LED or the like, is provided at the knob. Due to this illuminating means emitting light, it is even easier to confirm the shift pattern and the shift positions indicated at the knob.

However, as in the structures disclosed in Japanese Patent Applications Laid-Open (JP-A) Nos. 61-50835 and 62-84809, providing an illuminating means such as a lamp or an LED or the like at the knob of the shift lever causes the internal structure of the knob to become complex, and as a result, the knob becomes larger.

SUMMARY OF THE INVENTION

An object of the present invention is to provide a shift lever device in which a shift pattern, shift positions, and the like provided at a knob can be clearly seen without the knob being made to be large.

In order to achieve the above object, in accordance with an aspect of the present invention, there is provided a shift lever device for operation of a transmission of a vehicle having a plurality of shift ranges, the shift lever device comprising: a lever main body for shifting whose proximal end side is connected one of directly and indirectly to the transmission, and whose distal end side projects into a vehicle cabin, and which has shift positions corresponding to the respective shift ranges; a housing movably supporting the lever main body one of directly and indirectly; a light source provided one of directly and indirectly at one of the housing and the lever main body; a knob mounted to a distal end portion of the lever main body, and having a transmitting portion through which light can be transmitted, and transmitting light, which has been guided to an interior of the knob from the transmitting portion, to an exterior of the knob; and a light guiding portion provided at least one of the knob and the lever main body, and guiding light from the light source to the interior of the knob.

The above and other objects, features, and advantages of the present invention will become apparent to those skilled in the art from the description of the preferred embodiments of the present invention illustrated in the appended drawings, and from the appended claims.

BRIEF DESCRIPTION OF THE DRAWINGS

FIG. 4 is a plan view showing a shift pattern and shift positions of the shift lever device relating to the first embodiment of the present invention.

DETAILED DESCRIPTION OF THE INVENTION

Structure of First Embodiment

Figure 1:
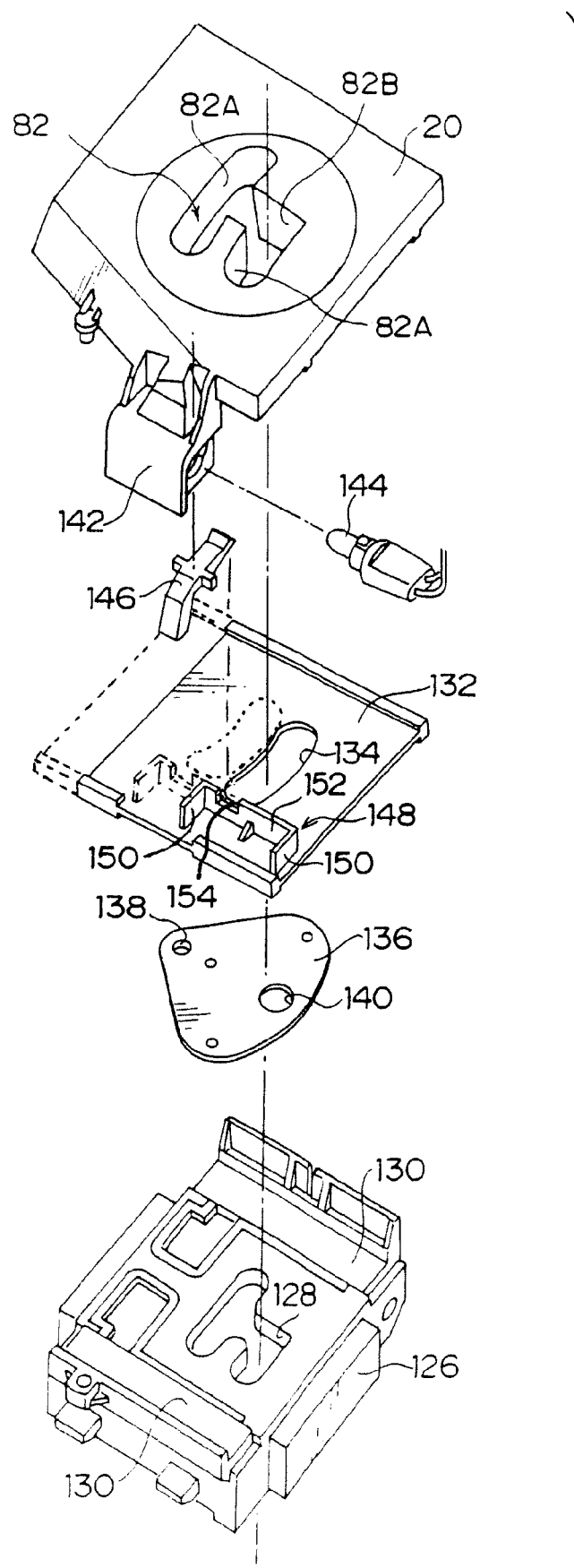
FIG. 1 is an exploded perspective view of main portions of a shift lever device relating to a first embodiment of the present invention.
Figure 3:
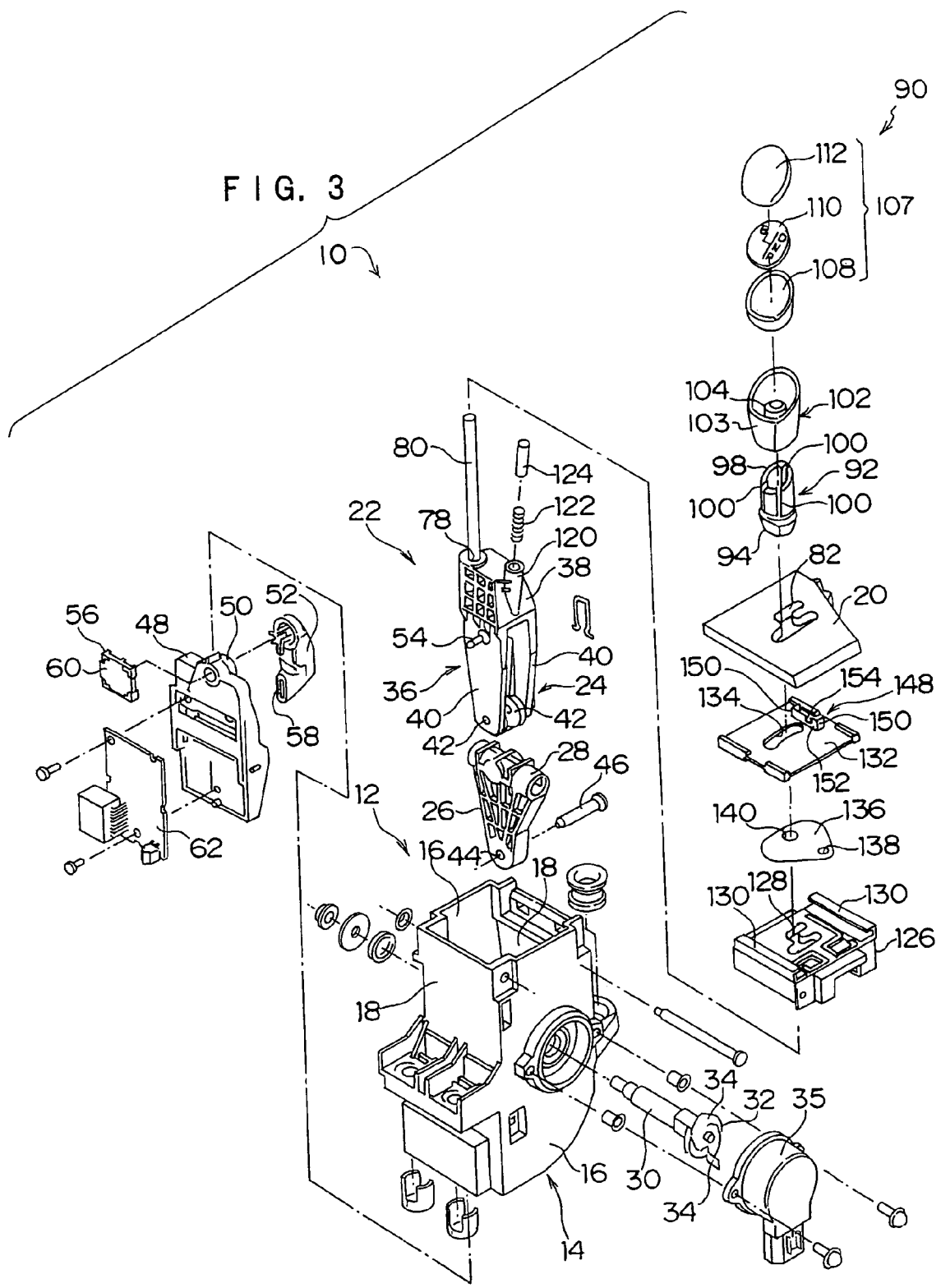
FIG. 3 is an exploded perspective view showing the overall structure of the shift lever device relating to the first embodiment of the present invention.

The structure of a shift lever device 10 relating to a first embodiment of the present invention is shown in FIG. 3 in an exploded perspective view. The structure of main portions of the shift lever device 10 is shown in FIG. 1 in an exploded perspective view. As shown in FIG. 3, the shift lever device 10 has a lower housing 14 which structures a housing 12. The lower housing 14 is provided, for example, at a predetermined position at the front side between the driver's seat and the front passenger's seat of a vehicle. For example, the lower housing 14 may be provided beneath the front side of the console box, or at the reverse surface side of the instrument panel, or the like.

The lower housing 14 includes a pair of side walls 16, which oppose one another along the substantially left-right direction of the vehicle, and a pair of side walls 18, which oppose one another along the substantially front-back direction of the vehicle, such that the lower housing 14 is formed in the shape of a tube having a substantially rectangular cross-section. The upper side open end of the lower housing 14 in FIG. 3 is closed by an upper housing 20. The top surface of the upper housing 20 is exposed in the vehicle cabin. Due to the open end of the lower housing 14 being closed by the upper housing 20, all of the members at the interior of the lower housing 14 are concealed, and entry of foreign matter and the like therein is prevented or suppressed.

A lever main body 24, which structures a shift lever 22, is provided at the inner side of the lower housing 14. The lever main body 24 has a retainer 26. The retainer 26 is formed, in front view, in the shape of an upside-down triangle whose lower end is the apex. A tube portion 28, which is substantially tube-shaped and passes through along the direction in which the side walls 16 oppose one another, is formed at the top end portion of the retainer 26.

A shaft 30, whose axial direction runs along the direction in which the side walls 16 oppose one another, is connected substantially integrally to the tube portion 28 in a state of passing therethrough. At the both axial direction end sides of the shaft 30, the shaft 30 passes through the side walls 16 and is supported by the side walls 16. In this way, the retainer 26 and the shaft 30 are supported so as to be rotatable around the axis of the shaft 30.

A sensor arm 32 is fixed integrally by a screw or the like to one axial direction end of the shaft 30. A pair of pushing pieces 34, whose direction of thickness runs along the rotation peripheral direction of the shaft 30, are formed at the sensor arm 32. These pushing pieces 34 are set in at the inner side of a sensor case 35 which is mounted integrally to the side wall 16 which supports the end portion of the shaft 30 at the side where the sensor arm 32 is provided.

A single or plural Hall IC elements, which serve as magnetic sensors and structure a position detecting means (a shift direction position detecting means), and a single or plural magnets, which, together with the Hall IC elements serving as the magnetic sensors, structure the position detecting means, are accommodated within the sensor case 35. (Note that these members to which reference numerals are not given are not illustrated in the drawings.) The magnets accommodated in the sensor case 35 are engaged either directly or indirectly with the pushing pieces 34. When the pushing pieces 34 push the magnets due to the shaft 30 rotating around its axis, the magnets move due to the pushing forces from the pushing pieces 34.

When the Hall IC elements housed in the sensor case 35 detect the fluctuation in the magnetism generated by this movement of the magnets, a signal from the Hall IC elements is inputted to an ECU on a PC board 62 which will be described later, such that the rotation of the shaft 30, and accordingly the retainer 26, around the axis of the shaft 30 is detected at the ECU.

The lever main body 24 has a body 36. The body 36 has a block-shaped base portion 38. A pair of leg plates 40 extend from the bottom end portion of the base portion 38. The leg plates 40 are formed such that the directions of thickness thereof run along the direction in which the side walls 18 oppose one another, and are formed so as to oppose one another along the direction in which the side walls 18 oppose one another.

The interval between the leg plates 40 is slightly greater than the thickness of the retainer 26, and the retainer 26 is disposed between the leg plates 40. Through holes 42, which pass through along the direction of thickness of the leg plates 40, are formed in the lower end portions of the leg plates 40. A through hole 44 is formed in the lower end portion of the retainer 26 in correspondence with these through holes 42. A shaft 46, whose axial direction runs along the direction in which the side walls 18 oppose one another, passes through the through holes 42, 44. The body 36 is supported so as to be rotatable relative to the retainer 26 around the axis of the shaft 46.

A sensor case 48 is disposed within the lower housing 14 at the side of one of the leg plates 40 which side is opposite the side at which the other leg plate 40 is located. A shaft 50 is formed to project toward the body 36 at the upper end portion of the sensor case 48. A sensor link 52 is supported so as to be rotatable around an axis whose axial direction is the direction in which the side walls 18 oppose one another.

An engaging projection 54 is formed to project toward the sensor case 48, at one side wall so as to correspond to the sensor link 52. The engaging projection 54 is mechanically connected to the sensor link 52. When the body 36 rotates around the shaft 46, the engaging projection 54 pushes the sensor link 52 and rotates the sensor link 52 around the shaft 50.

A slider 56 is disposed at the side of the sensor case 48 opposite the side at which the sensor link 52 is disposed. The slider 56 is held at the sensor case 48 so as to be slidable along the direction in which the side walls 16 oppose one another. An unillustrated engaging pin, which projects from the slider 56, passes through the sensor case 48 and engages with a long hole 58, which is formed at the distal end side of the sensor link 52 in the rotation radial direction, in a state of being set within the long hole 58.

Due to the engaging pin of the slider 56 being pressed by the inner wall of the long hole 58 when the sensor link 52 rotates around the axis of the shaft 50, the slider 56 slides in the direction in which the side walls 16 oppose one another. Further, a magnet (permanent magnet) 60, which structures the position detecting means (a select direction position detecting means) is fixed to the slider 56. The magnet 60 is, for example, an Sr ferrite magnet, and forms a predetermined magnetic field at the periphery thereof. Due to the magnet 60 being fixed to the slider 56, the magnet 60 slides integrally with the slider 56. Accordingly, due to the magnet 60 sliding in this way, the magnetic field formed at the periphery of the magnet 60 also slides.

The PC board 62 is mounted to the sensor case 48 at the side of the slider 56 opposite the side at which the sensor case 48 is located. At the PC board 62, a pair of Hall IC elements 64, 66 (refer to FIG. 4 as they are not illustrated in FIG. 3), which are connected to the unillustrated ECU, are disposed so as to be lined up in the direction in which the side walls 16 oppose one another. The Hall IC elements 64, 66 detect the fluctuation in the magnetic field which the magnet 60 forms (more specifically, the changes in the strengths of the magnetisms passing through the Hall elements structuring the Hall IC elements 64, 66), and output electrical signals corresponding to the fluctuation in the magnetic field.

On the other hand, as shown in FIG. 3, a circular hole 78 having a floor is formed in the top surface of the base portion 38 of the body 36. The proximal end portion of a rod-shaped lever member 80, which structures the shift lever 22, is inserted in and fixed integrally in the circular hole 78. The intermediate portion of the lever member 80 in the longitudinal direction thereof passes through a shift hole 82 formed in the upper housing 20. The shift hole 82 is formed overall substantially in the shape of the letter "h" in plan view, by lengthwise holes 82A whose longitudinal directions are a predetermined direction, and a sideways hole 82B whose longitudinal direction is a direction intersecting (e.g., orthogonal to) the longitudinal direction of the lengthwise holes 82A. The lever member 80 passes through the shift hole 82, and the distal end side of the lever member 80 extends to the exterior of the upper housing 20. A knob 90 is mounted to the lever member 80 which extends to the exterior of the upper housing 20.

As shown in FIGS. 2 through 5, the knob 90 has a knob main body 92 which serves as a light guiding means. The knob main body 92 has a base portion 94 formed of synthetic resin material which is substantially transparent or which is colored to the extend that light can be transmitted therethrough, e.g., an acrylic resin (PMMA: polymethylmethacrylate or methacrylic resin) or the like. A pass through hole 96 is formed in the base portion 94. The distal end side of the lever member 80 is inserted into the pass through hole 96. A light guide 98, which, in the same way as the base portion 94, is formed from a synthetic resin material which is substantially transparent or is colored to the extent that light can be transmitted therethrough, is formed at the top surface of the base portion 94.

Figure 2:
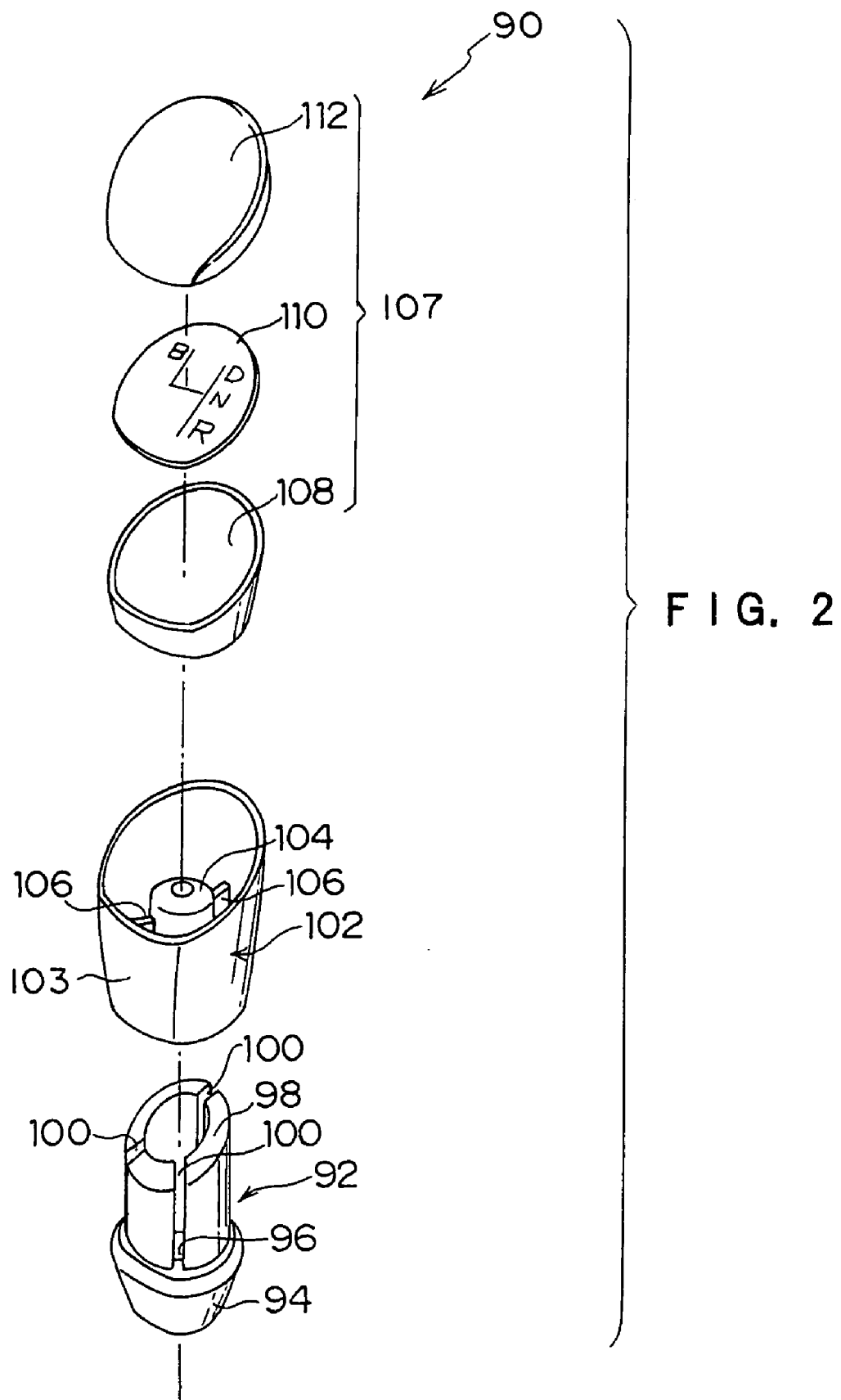
FIG. 2 is an exploded perspective view of a knob of the shift lever device relating to the first embodiment of the present invention.

As shown in FIG. 2, the light guide 98 is basically formed in the shape of a cylindrical tube which is substantially coaxial to the pass through hole 96. Three slits 100 are formed in the light guide 98 at intervals of a predetermined angle around the axis of the pass through hole 96. The slits 100 are open at the inner peripheral portion, the outer peripheral portion, and the top end portion of the light guide 98. By forming these slits 100, the light guide 98 is substantially divided into three sections around the axis of the pass through hole 96.

Figure 5:
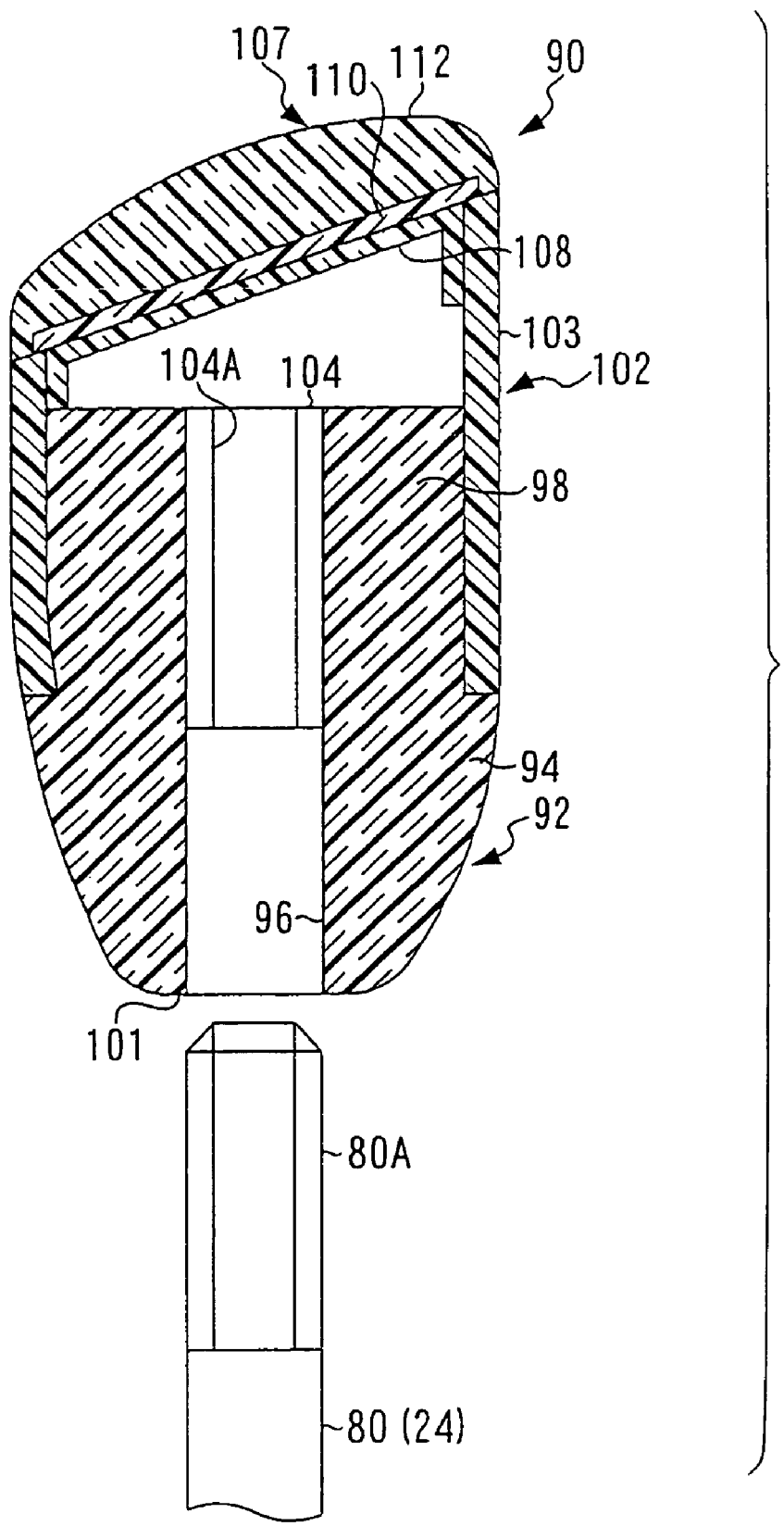
FIG. 5 is a sectional view of the knob of the shift lever device relating to the first embodiment of the present invention.

As shown in FIG. 5, the end surface of the base portion 94 at the side opposite the light guide 98 is a light admitting surface 101. When light is illuminated onto the light admitting surface 101, the light is taken-in from the light admitting surface 101 to the interior of the knob main body 92.

Further, as shown in FIGS. 2 and 5, the knob 90 has a knob body 102 serving as a covering portion. The knob body 102 has an outer tube portion 103 which is formed substantially in the shape of a tube from a synthetic resin material such as nylon resin (PA) or the like which is colored to the extent that light cannot pass therethrough. The inner peripheral configuration of the outer tube portion 103 corresponds to the outer peripheral configuration of the light guide 98. Due to the outer tube portion 103 being mounted to the light guide 98 from above the knob main body 92 such that the light guide 98 is inserted into the outer tube portion 103, the outer peripheral portion of the light guide 98 is covered by the outer tube portion 103.

A female screw portion 104, which is formed of metal and substantially in the shape of a cylindrical tube and at which a female screw 104A is formed at the inner peripheral portion thereof, is provided at the inner side of the outer tube portion 103. Plural connecting pieces 106 are provided at intervals of a predetermined angle around the axis of the female screw portion 104, between the outer peripheral portion of the female screw portion 104 and the inner peripheral portion of the knob body 102. The knob body 102 and the female screw portion 104 are connected integrally by the connecting pieces 106. The direction of thickness of the connecting pieces 106 runs along the direction around the axis of the female screw portion 104. The thicknesses of the connecting pieces 106 are extremely slightly smaller than the inner widths of the aforementioned slits 100.

The connecting pieces 106 are formed so as to correspond to the slits 100. When the light guide 98 is inserted in at the inner side of the outer tube portion 103, the female screw portion 104 is inserted coaxially in at the inner side of the light guide 98, and the connecting pieces 106 are fit in the respective slits 100. In this way, relative displacement of the knob body 102 with respect to the knob main body 92 along the direction around the axial center of the light guide 98 and the female screw portion 104, is restricted.

In the state in which the knob body 102 is mounted to the knob main body 92 in this way, the lever member 80 is inserted in from beneath the base portion 94 of the knob main body 92, and a male screw 80A formed at the distal end of the lever member 80 is screwed together with the female screw 104A of the female screw portion 104. The knob 90 is thereby connected to the lever member 80.

On the other hand, a cap 107 is provided above the female screw portion 104. The cap has a guide lens 108 serving as a transmitting portion. In the same way as the above-described light guide 98, the guide lens 108 is formed of a synthetic resin material which is substantially transparent or is colored to the extent that light can be transmitted therethrough, and the guide lens 108 is disposed at the inner side of the outer tube portion 103. The outer peripheral configuration of the guide lens 108 corresponds to the outer peripheral configuration of the outer tube portion 103 (the knob body 102). The guide lens 108 is fixed integrally to the inner peripheral portion of the outer tube portion 103 by an adhesive which is applied to the outer peripheral portion of the guide lens 108.

An indicator plate 110 serving as the transmitting portion is provided above the guide lens 108. The indicator plate 110 is basically formed by a plate member which is substantially transparent. However, the portions of the indicator plate 110 other than a shift pattern portion, which corresponds to the configuration of the shift hole 82 formed in the upper housing 20, and marks, which are located at the sides of this shift pattern portion and signify the shift ranges, are colored to a color such that light cannot pass therethrough. Accordingly, even if light is illuminated uniformly from beneath the indicator plate 110, light passes through only the regions of the shift pattern portion and the marks.

An indicator lens 112 serving as the transmitting portion is provided above the indicator plate 110. In the same way as the guide lens 108, the indicator lens 112 is formed of a synthetic resin material which is substantially transparent or which is colored to the extent that light can be transmitted therethrough. Although the outer peripheral configuration of the indicator lens 112 is a configuration which is substantially similar to the indicator plate 110, it is slightly larger than the indicator plate 110, and the outer peripheral configuration of the indicator lens 112 is substantially the same configuration as the outer peripheral configuration at the top end of the knob body 102.

The indicator lens 112, the indicator plate 110 and the guide lens 108 are formed integrally by in-mold molding, and are fixed integrally to the top end portion of the knob body 102 by an adhesive which is applied to the bottom surface of the indicator lens 112 (the indicator plate 110 side surface of the indicator lens 112) which is positioned further toward the outer side than the outer peripheral portion of the indicator plate 110.

On the other hand, as shown in FIG. 3, a cylindrical-tube-shaped pin accommodating portion 120 is formed at the base portion 38 of the body 36, at the side of the lever member 80. The pin accommodating portion 120 is open at the end portion thereof which is at the upper side in FIG. 3. A compression coil spring 122 and a pin 124 are accommodated in the pin accommodating portion 120. Further, as shown in FIGS. 1 and 3, a gate member 126 is disposed at the inner side of the lower housing 14 and at the reverse side of the upper housing 20. An unillustrated return groove is formed in the reverse surface of the gate member 126.

The return groove is a groove having a floor, with the floor being located at the upper side (i.e., a "top floor). In plan view (a reverse surface view), the return groove is formed substantially in the shape of the letter "h" reversed, in the same way as the shift hole 82. The top end of the pin 124 is set in the return groove in a state of compressing the compression coil spring 122 from above, and press-contacts the top floor of the return groove due to the urging force of the compression coil spring 122. The top floor of the return groove is slanted appropriately. In a state in which the lever main body 24 is positioned at a return position S in the shift hole 82 shown in FIG. 4, the position of the return groove, which position is the same as the return position, is where the return groove is the deepest.

Further, as shown in FIG. 1, a shift hole 128 having substantially the same configuration as the shift hole 82 is formed in the gate member 126, and the lever member 80 passes through the shift hole 128. A pair of gate plates 130 are provided at the gate member 126. The gate plates 130 are provided at the both end sides of the gate member 126 in the direction in which the side walls 18 oppose one another. The gate plates 130 are formed integrally with the gate member 126 in a state of being set apart from the top surface of the gate member 126, to the extent that a predetermined gap is formed between the gate plates 130 and the top surface of the gate member 126.

A cover plate 132 is disposed on the top surface of the gate member 126. The cover plate 132 is formed in a substantially rectangular shape as seen in plan view. The both end sides of the cover plate 132 in the direction in which the side walls 18 oppose one another, are set between the top surface of the gate member 126 and the gate plates 130. In this way, displacement of the cover plate 132, other than sliding thereof in the direction along the direction in which the side walls 16 oppose one another, is basically restricted.

A long hole 134 is formed in the cover plate 132 in correspondence with the aforementioned shift hole 128 of the gate member 126. The lever member 80 passes through the long hole 134. When the retainer 26 and the body 36 rotate around the axis of the shaft 30, the lever member 80 moves within the long hole 134 along the longitudinal direction of the long hole 134.

In contrast, when the body 36 rotates around the axis of the shaft 46, the lever member 80 pushes the inner peripheral portion of the long hole 134 and pushes the cover plate 132, so as to slide the cover plate 132 along the direction in which the side walls 16 oppose one another.

A cover plate 136, which is substantially triangular or substantially fan-shaped, is disposed at the reverse surface of the cover plate 132 (i.e., between the cover plate 132 and the top surface of the gate member 126). An unillustrated pin, which projects from the reverse surface of the cover plate 132, is fit in a through hole 138 formed in a corner portion of the cover plate 136. In this way, the cover plate 136 is supported so as to rotate freely around the axis of this pin, i.e., around an axis whose axial direction is the direction of thickness of the cover plate 132.

A circular hole 140 is formed in the cover plate 136. The circular hole 140 is formed so as to correspond to the aforementioned long hole 134 and shift hole 128. The lever member 80 passes through the circular hole 140.

A lamp house 142 is formed at the above-described upper housing 20. A lamp (light bulb) 144, which is lit by electricity being supplied thereto, is accommodated within the lamp house 142. A light guide 146, which is shaped as a rectangular rod and which is bent appropriately, is accommodated in the lamp house 142. A portion of the light guide 146 faces the lamp 144. One end surface of the light guide 146 in the longitudinal direction thereof faces the bottom surface of the base portion 94, which structures the above-described knob main body 92, along a direction which is inclined with respect to the longitudinal direction of the lever member 80.

A shutter 148, which serves as a light controlling means and a shutter member, is formed on the top surface of the cover plate 132 in correspondence with the lamp 144 and the light guide 146. The shutter 148 has side walls 150 which oppose one another along the direction in which the side walls 16 oppose one another. The side walls 150 are disposed at an interval which is such that they do not interfere with the lamp house 142 even when the cover plate 132 slides in the direction in which the side walls 16 oppose one another. A portion of the lamp house 142 is accommodated at the inner side of the side walls 150.

Figure 16:
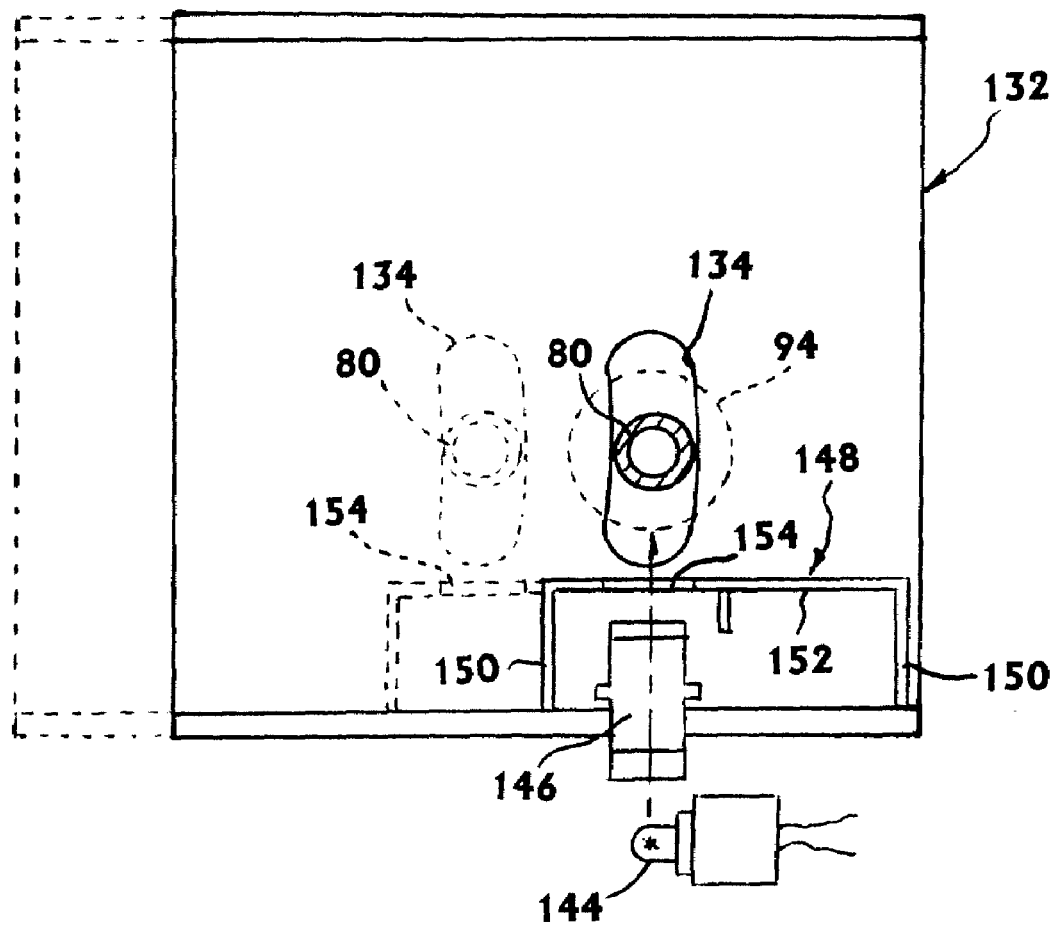
FIG. 16 is a plan view of the cover plate 132 shown in FIG. 1A illustrating the operation of the shutter 148.

The end portions of the side walls 150, which end portions are at the long hole 134 side, are connected together by a shutter wall 152. A rectangular cut-out 154 is formed in the shutter wall 152. Rectangular cut-out 154 operates as light conducting aperture, while the rest of the shutter wall 152 operates as a light blocking wall. As is best seen in FIG. 16, in a state in which one end surface of the light guide 146 and the cut-out 154 face one another along the direction in which the side walls 18 oppose one another, the light exiting from one end of the light guide 146 can reach the lower end of the base portion 94. However, in the state in which a region of the shutter wall 152 other than the cut-out 154 is interposed between the one end of the light guide 146 and the bottom end of the base portion 94, the light exiting from the one end of the light guide 146 is blocked by the shutter wall 152, and cannot reach the bottom end of the base portion 94.

Operation and Effects of the First Embodiment

Next, the operation and effects of the present embodiment will be described.

In the present shift lever device 10, when, from the state in which the lever main body 24 passes through the shift hole 82 at the S position in FIG. 4, the knob 90 is grasped and the shift lever 22 is pushed toward the right in FIG. 4 (in the direction of arrow R in FIG. 4), the body 36 rotates around the shaft 46 with respect to the retainer 26. The lever member 80 thereby passes through the shift hole 82 at the N position of FIG. 4. When the body 36 rotates around the shaft 46 with respect to the retainer 26 in this way, the engagement projection 54 pushes the sensor link 52 and rotates the sensor link 52 around the shaft 50.

When the sensor link 52 rotates, the slider 56, and accordingly, the magnet 60, slide. Due to the magnet 60 sliding, the position of the magnet 60 with respect to the PC board 62 changes. The state in which the magnet and the Hall IC element 64, which had faced the magnet 60 until now, face one another is thereby cancelled, and the Hall IC element 66, which had not faced the magnet 60 until now, newly faces the magnet 60. In this way, the signal outputted from the Hall IC element 64 becomes low level, and the signal outputted from the Hall IC element 66 becomes high level.

Next, when, from this state, the knob 90 is pushed upward in FIG. 4 (in the direction of arrow U in FIG. 4), the body 36 and the retainer 26 rotate around the shaft 30. In this way, when the lever member 80 passes through the shift hole 82 at position D in FIG. 4 (i.e., when the lever member 80 reaches the predetermined D position among the plural shift positions), the magnets accommodated in the sensor case 35 are pushed by the pushing pieces 34 and move. The Hall IC elements accommodated in the sensor case 35 detect the fluctuations in the magnetic fields which change in accordance with the movement of the magnets, and a signal corresponding to the fluctuations in the magnetic fields is inputted to the ECU 68 of the PC board 62.

On the other hand, when the knob 90 is pushed downward in FIG. 4 (in the direction of arrow D in FIG. 4) after the shift lever 22 is rotated from the S position to the N position as described above, the body 36 and the retainer 26 rotate around the shaft 30. In this way, when the lever member 80 passes through the shift hole 82 at the R position in FIG. 4 (i.e., when the lever member 80 reaches the predetermined R position among the plural shift positions), the magnets accommodated in the sensor case 35 are pushed by the pushing pieces 34 and move. The Hall IC elements accommodated in the sensor case 35 detect the fluctuations in the magnetic fields which change in accordance with the movement of the magnets, and a signal corresponding to the fluctuations in the magnetic fields is inputted to the ECU 68 of the PC board 62.

In contrast, when, from the state in which the lever main body 24 passes through the shift hole 82 at the S position in FIG. 4, the knob 90 is pushed upward in FIG. 4 (in the direction of arrow U in FIG. 4), the body 36 and the retainer 26 rotate around the shaft 30. In this way, when the lever member 80 passes through the shift hole 82 at the B position in FIG. 4 (i.e., when the lever member 80 reaches the predetermined B position among the plural shift positions), the magnets accommodated in the sensor case 35 are pushed by the pushing pieces 34 and move. The Hall IC elements accommodated in the sensor case 35 detect the fluctuations in the magnetic fields which change in accordance with the movement of the magnets, and a signal corresponding to the fluctuations in the magnetic fields is inputted to the ECU 68 of the PC board 62.

As described above, depending on which of the S position, the D position, the R position, and the B position the lever main body 24 passes through the shift hole 82 at, the level of at least one of the signals from the Hall IC elements 64, 66 and the Hall IC elements in the sensor case 35 differs. On the basis of the changes in the levels of these signals, at the ECU 68 of the PC board 62, it is determined at which of the S position, the D position, the R position and the B position the lever member 80 (i.e., the shift lever 22) is positioned.

The ECU 68 outputs a signal which is based on the results of judgment of the position of the lever member 80. The signal outputted by the ECU 68, i.e., the results of judgment of the position of the lever member 80, is inputted to an ECU 70.

If, based on the signal from the ECU 68, the position of the lever member 80 is the D position, the ECU 70 changes the shift range to the drive range (D range), and the vehicle is set in a state in which it can proceed straight forward. If the position of the lever member 80 is the R position, the ECU 70 changes the shift range to the reverse range (R range), and the vehicle is set in a state in which it can move backward. Further, if the position of the lever member 80 is the B position, the ECU 70 changes the shift range to the engine brake (B range), so as to change to a shift range mainly using gears having a relatively low gear ratio. When, in a state in which the vehicle is traveling by using gears intrinsically having a relatively high gear ratio, the shift range is changed in this way to a shift range mainly using gears having a low gear ratio, a state in which the so-called engine brake is applied arises.

Further, as described above, when, after the lever member 80 (the shift lever 22) is moved from the S position to the D position or the R position or to the B position, the pushing force applied to the knob 90 is released, the pin 124, which press-contacts the top floor of the gate groove formed in the reverse surface of the gate member 126 due to the urging force of the compression coil spring 122, is moved, due to the reaction force received from the top floor of the gate groove in accordance with the urging force of the compression coil spring 122, to the S position which is the region where the gate groove is the deepest. In this way, the lever member 80 (the shift lever 22) returns to the S position.

In this way, at the present shift lever device 10, the lever member 80 (the shift lever 22) is basically maintained in a state of passing through the shift hole 82 at the S position. When the shift range is changed, the lever member 80 (the shift lever 22) is rotated to the shift position corresponding to the desired shift range (the D position or the R position, or the B position). After the shift range is changed, the lever member 80 (the shift lever 22) returns to the S position. Until the lever member 80 (the shift lever 22) is rotated to another shift position, the shift range until then is maintained.

On the other hand, when a switch operation within the vehicle cabin for lighting the headlights of the vehicle or the vehicle position lamps (or vehicle road lights) at night or the like is carried out, interlockingly therewith, the lamp 144 is lit. In the above-described state in which the lever main body 24 passes through the shift hole 82 at the S position, the bottom surface of the base portion 94 and one longitudinal direction end of the light guide 146 face one another via the cut-out 154. Accordingly, in this state, the light of the lamp 144 is guided by the light guide 146 and exits from one longitudinal direction end of the light guide 146.

The light exiting from the one longitudinal direction end of the light guide 146 passes through the cut-out 154 and is incident on the bottom end of the base portion 94. The light which is incident on the bottom end of the base portion 94 passes through the light guide 98 from the base portion 94, and exits out from the top surface of the light guide 98. The light which exits from the top surface of the light guide 98 is incident on the guide lens 108, passes through the indicator plate 110 and the indicator lens 112, and exits out to the exterior of the knob 90.

As described above, the indicator plate 110 is structured such that light can pass through only the shift pattern portion, which corresponds to the configuration of the shift hole 82, and the marks, which are located at the sides of this shift pattern portion and signify the shift ranges. Therefore, the top end (the distal end) of the knob 90 emits light in correspondence with the configurations of the shift pattern portion and the marks. Accordingly, by visually confirming the top surface of the knob 90, the shift pattern can be confirmed even in cases in which the vehicle cabin is dark such as at night or the like.

On the other hand, and as best seen with respect to FIG. 16, when the lever member 80 (the shift lever 22) is rotated from the S position to the N position as described above, the cover plate 132, which is pushed by the lever member 80, slides. Due to the sliding of the cover plate 132, the shutter wall 152 slides, and the state in which the cut-out 154 and the light guide 146 face one another is cancelled, such that a portion of the shutter wall 152 other than the cut-out 154 is disposed on the optical path from the light guide 146 to the bottom end of the base portion 94.

In this way, the light heading from the light guide 146 to the base portion 94 is blocked off, and cannot be incident on the bottom end of the base portion 94. Therefore, the emission of light at the top end (the distal end) of the knob 90 such as described above does not occur. In this way, in the present shift lever device 10, when the shift lever 22 is moved from the S position toward the N position in order to move the shift lever 22 to the D position or the R position, the emission of light at the top end of the knob 90 is stopped, and the light is extinguished.

In this way, by intentionally stopping the emission of light at the top surface of the knob 90, it becomes difficult for the vehicle occupant to see the shift pattern and the like at the top surface of the knob 90. Therefore, the vehicle occupant can be prevented from focusing on the knob 90 when changing the shift range to the drive range or the reverse range.

Further, in the present shift lever device 10, the light is led to the indicator lens 112 by the light guides 98, 146, without disposing the lamp 144, which is the light source, at the interior of the knob 90. Therefore, the structure of the knob 90 can be simplified, and the knob 90 can be made compact. Moreover, because the light guide 98 is a portion of the structure of the knob 90, the structure of the knob 90 can be simplified from this standpoint as well.

Structure of the Second Embodiment

Next, a second embodiment of the present invention will be described. Note that, in the description of the present embodiment, regions which are basically the same as those of the above-described first embodiment are denoted by the same reference numerals, and detailed description thereof is omitted.

Figure 6:
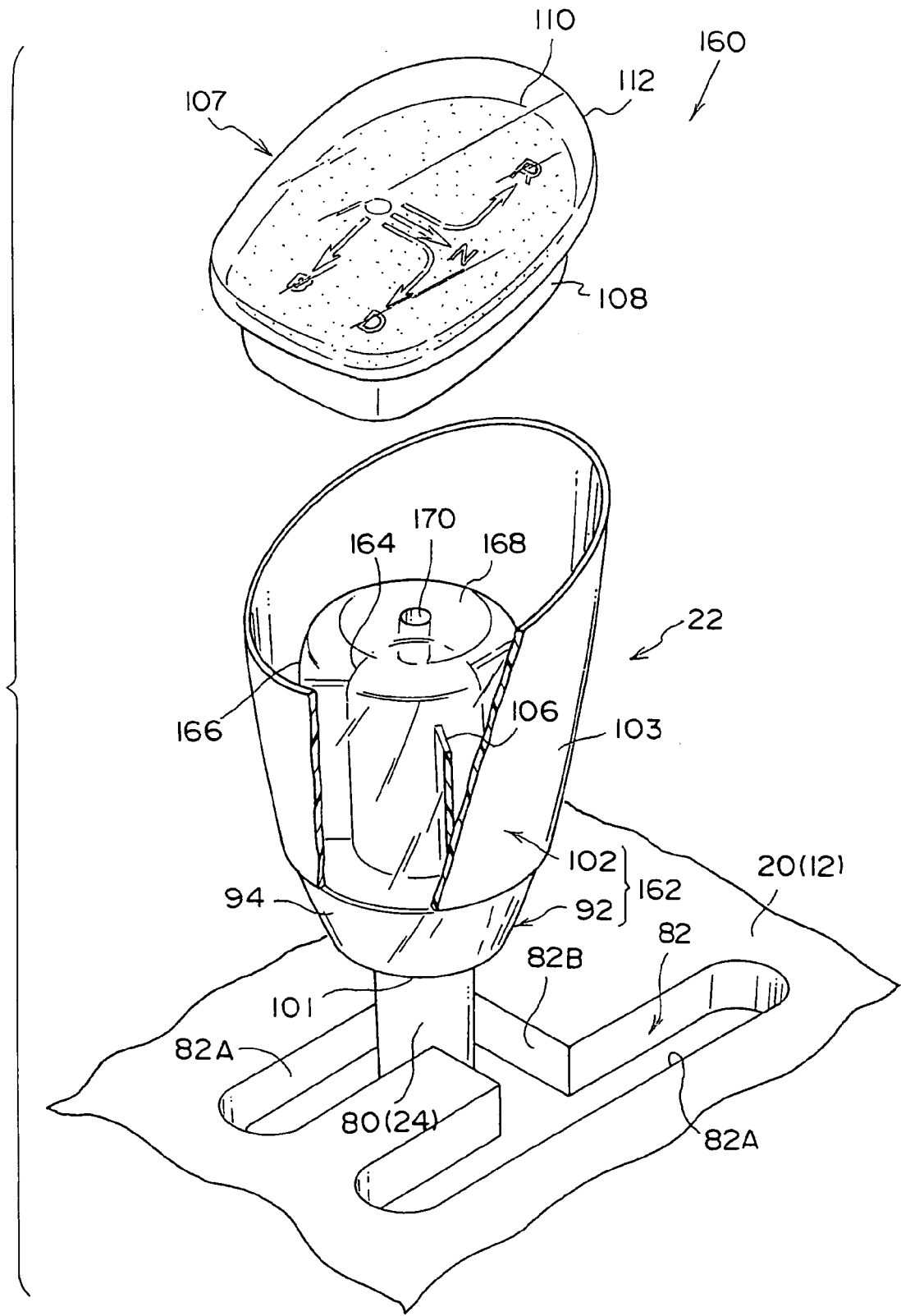
FIG. 6 is a perspective view of main portions of a shift lever device relating to a second embodiment of the present invention.
Figure 7:
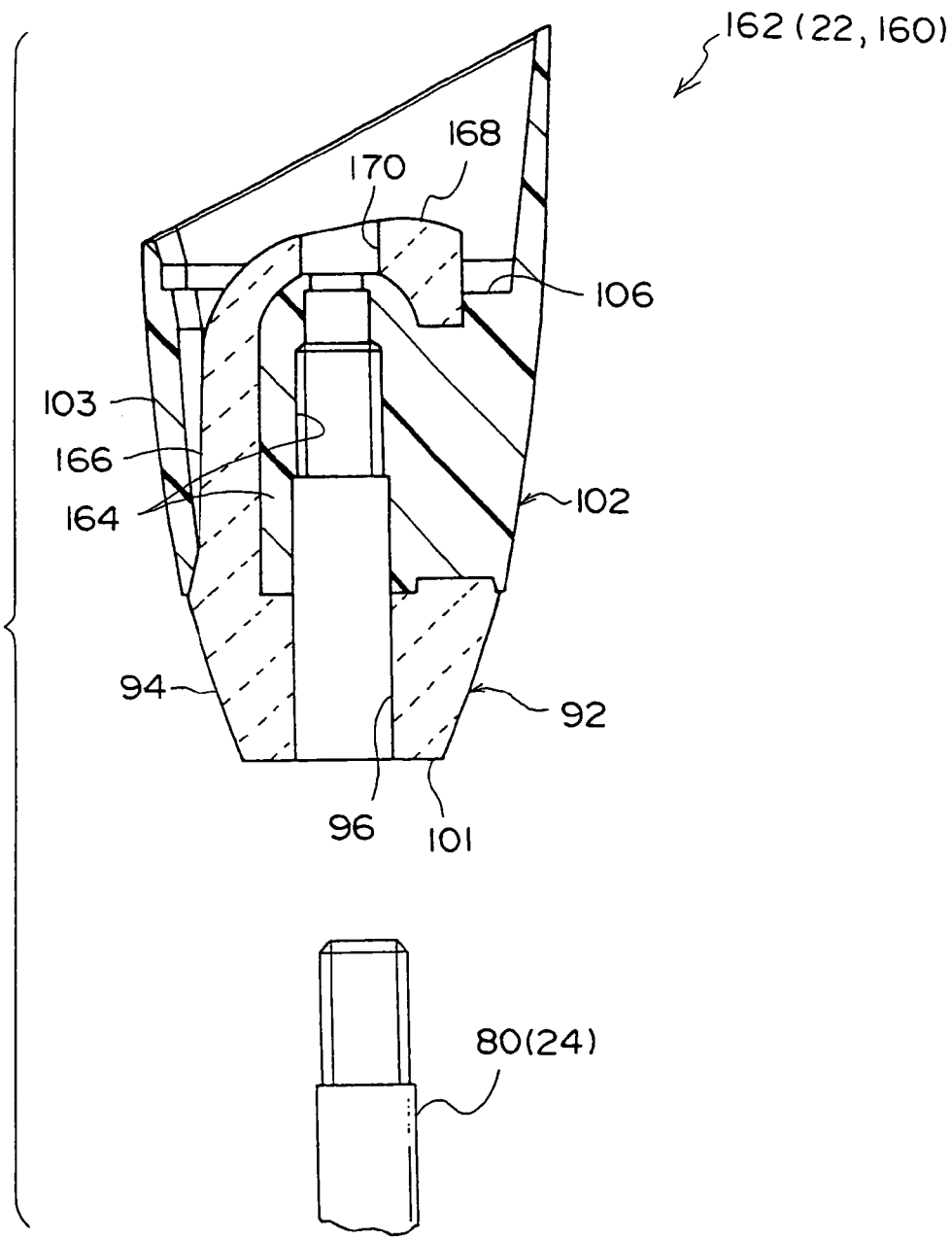
FIG. 7 is a sectional view of a knob of the shift lever device relating to the second embodiment of the present invention.

An enlarged perspective view of main portions of a shift lever device 160 relating to the present embodiment is shown in FIG. 6. An enlarged sectional view of main portions of the present shift lever device 160 is shown in FIG. 7.

As shown in these drawings, the knob body 102, which structures a knob 162 of the present shift lever device 160, does not have the female screw portion 104, and instead, has a female screw portion 164 which serves as a fixed portion. The female screw portion 164 is the same as the female screw portion 104 with regard to the points that the female screw portion 164 is formed in the shape of a cylindrical tube whose both ends open along the direction of opening of the outer tube portion 103, and that a female screw 164A is formed at the inner peripheral portion of the female screw portion 164. However, in the present embodiment, the structure of the female screw portion 164 differs from the female screw portion 104 of the above-described first embodiment with regard to the point that the female screw portion 164 is formed of the same synthetic resin material as the outer tube portion 103 and the connecting pieces 106.

On the other hand, in the present embodiment, the knob main body 92 has a light guide 166 instead of the light guide 98. The knob main body 92 including the light guide 166 is the same as in the above-described first embodiment with respect to the point that the knob main body 92 is, on the whole, formed from a transparent acrylic resin (PMMA: polymethylmethacrylate or methacrylic resin) or the like. However, in the present embodiment, the synthetic resin material which structures the knob main body 92 and the synthetic resin material which structures the knob body 102 are different in terms of their properties.

Further, the light guide 166 is formed in the shape of a cylindrical tube. However, differently from the light guide 98, the slits 100 are not formed in the light guide 166, and the connecting pieces 106 pass through the light guide 166 along the radial direction of the light guide 166.

The top end of the light guide 166, which is directed toward the top end side of the outer tube portion 103 (i.e., toward the axial direction other end side of the outer tube portion 103), is positioned further upward than the top end of the female screw portion 164. Further, in the present embodiment, a top floor portion 168 is formed at the top end of the outer tube portion 103. The top floor portion 168 covers the top end of the female screw portion 164 (i.e., the light guide 166 is basically formed in the shape of a cylindrical tube having a floor whose top end is closed by the top floor portion 168).

A through hole 170, which passes through in the axial direction of the light guide 166, is formed in the top floor portion 168. At the inner side of the light guide 166, the through hole 170 communicates with the inner side of the female screw portion 164. When the male screw 80A at the distal end of the lever member 80 (the lever main body 24, the shift lever 22), screws together with the female screw 164A of the female screw portion 164 and the distal end of the lever member 80 is adjacent to the top floor portion 168, the air within the female screw portion 164 is removed to the exterior of the female screw portion 164 and the light guide 166, such that air is prevented from being trapped within the female screw portion 164.

<Summary of Processes of Manufacturing the Knob 162, and Operation and Effects of the Present Embodiment>

Next, the processes of manufacturing the knob 162 of the present embodiment will be described.

Figure 8:
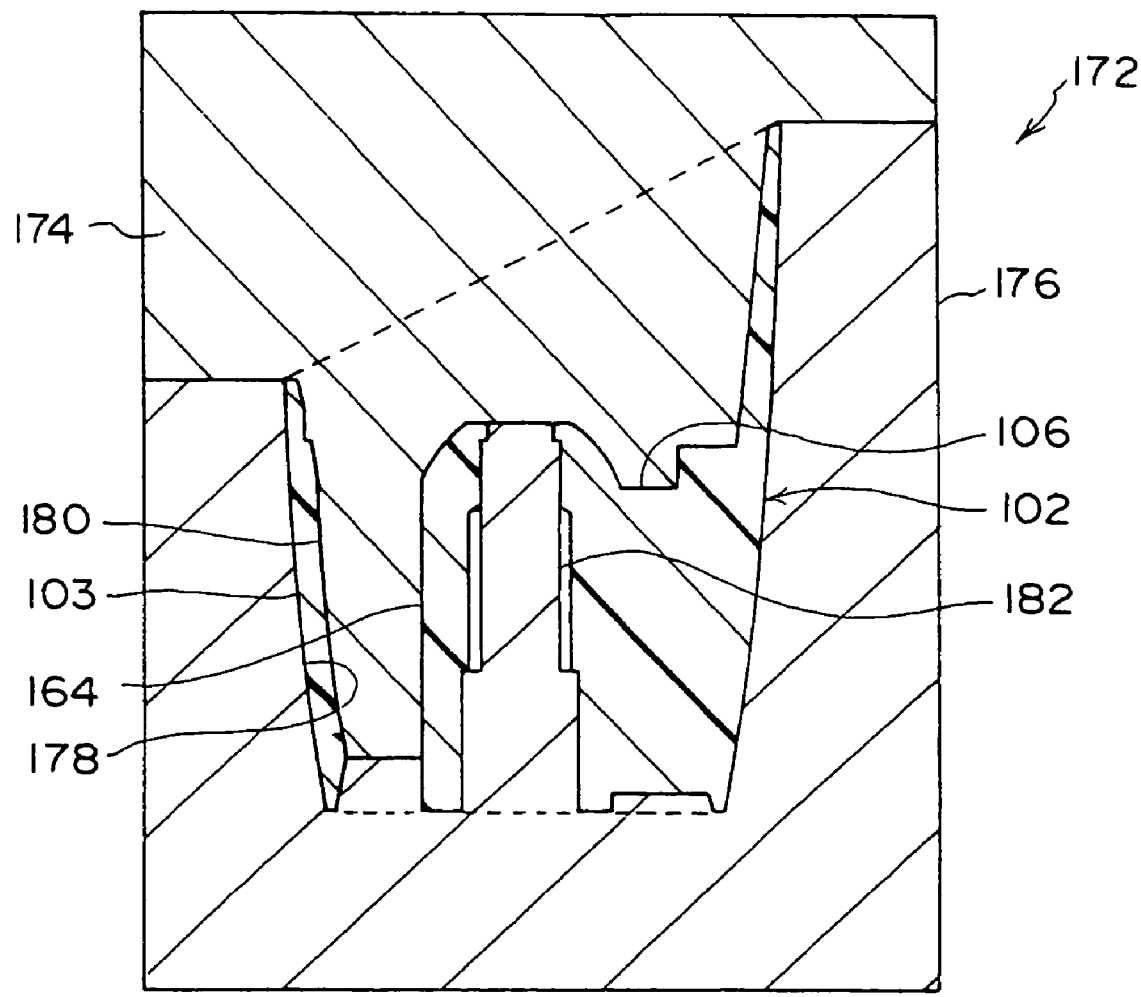
FIG. 8 is a schematic sectional view of a mold used in a knob body molding step.

In the processes of manufacturing the knob 162, first, the knob body 102 is manufactured in a knob body molding step. In the knob body molding step, as shown in FIG. 8, a mold 172, which is structured so as to include an upper mold 174 and a lower mold 176, is used.

A cavity 178 of the lower mold 176 is basically formed in a configuration corresponding to the configuration of the outer periphery of the outer tube portion 103. In correspondence with the cavity 178 of the lower mold 176, the configuration of a core 180 of the upper mold 174 is formed in correspondence with the inner peripheral configuration of the outer tube portion 103, except for the portions corresponding to the outer peripheral configurations of the connecting pieces 106 and the female screw portion 164. Further, a core 182 for screw molding is formed to project at the lower mold 176.

In the knob body molding step, the mold 172, which is structured so as to include this upper mold 174 and lower mold 176, is clamped. Thereafter, a synthetic resin material such as nylon resin (PA) or the like is filled into the mold 172.

The knob body 102 is molded due to the filled-in synthetic resin material cooling and hardening.

Figure 9:
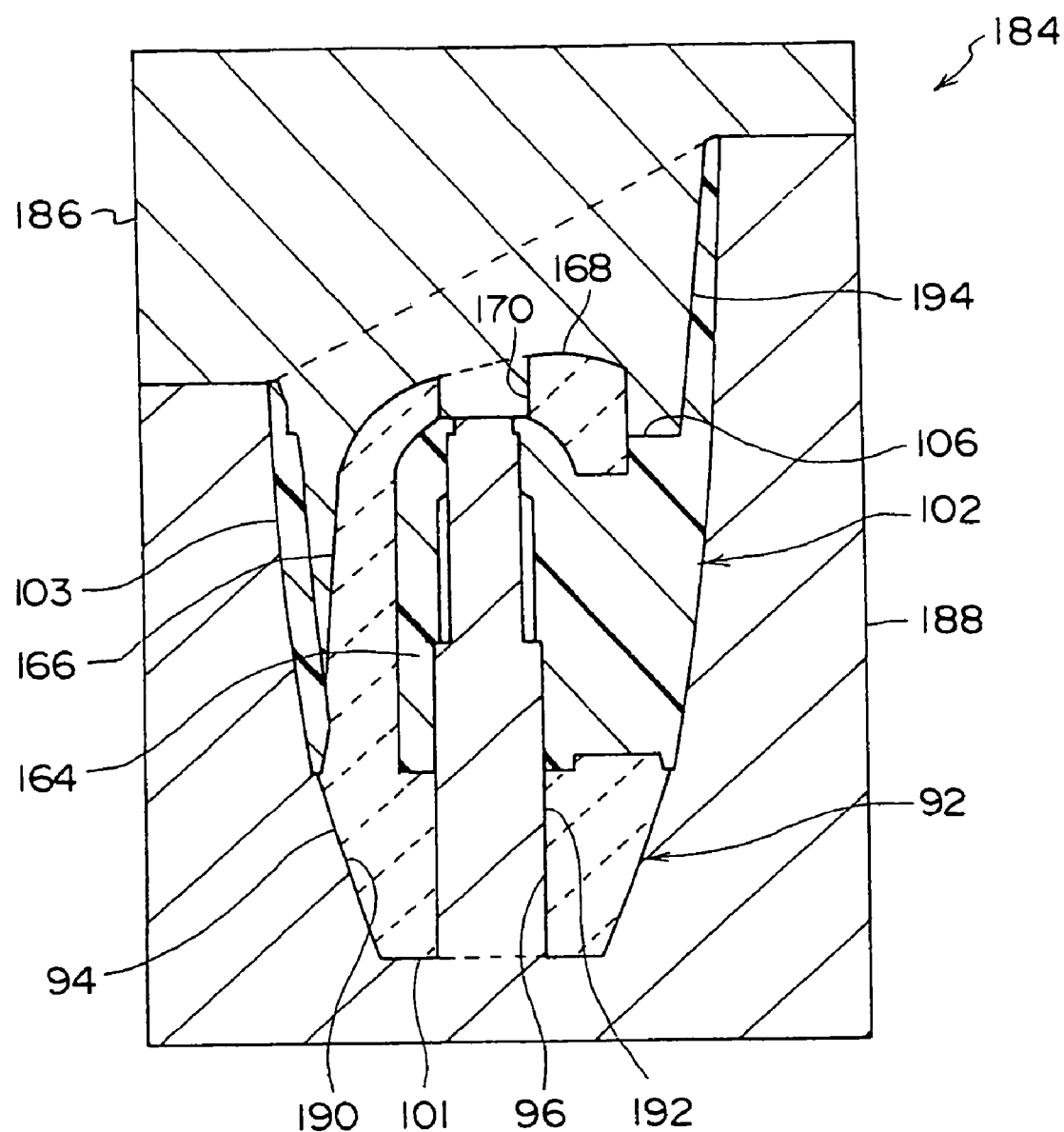
FIG. 9 is a schematic sectional view of a mold used in a guide molding step.

Next, as shown in FIG. 9, the knob body 102, which has been manufactured in the knob body molding step, is placed in a mold 184 which is used in a guide molding step. The mold 184 is structured so as to include an upper mold 186 and a lower mold 188. The inner peripheral configuration of a cavity 190 of the lower mold 188 at the portion further toward the upper side (the open end side) than the intermediate portion in the depthwise direction, corresponds to the outer peripheral configuration of the knob body 102 (i.e., the outer peripheral configuration of the outer tube portion 103). When the knob body 102 is placed within the cavity 190 of the lower mold 188, the outer peripheral portion of the knob body 102 uniformly abuts the inner peripheral portion of the cavity 190 at the portion further toward the upper side than the intermediate portion in the depthwise direction of the cavity 190. Further, a core 192 is formed in the cavity 190 of the lower mold 188 in correspondence with the inner peripheral portions of the through hole 44 and the female screw portion 164.

On the other hand, a core 194 is formed at the upper mold 186 except for the portion where the light guide 166 is molded. The outer peripheral configuration of the core 194 basically corresponds to the inner peripheral configuration of the outer tube portion 103. When the mold 184 is clamped in the state in which the knob body 102 is disposed within the cavity 190, the outer peripheral portion of the core 194 abuts the inner peripheral portion of the knob body 102.

In the guide molding step, the mold 184 is clamped in the state in which the knob body 102 is disposed within the lower mold 188, and a synthetic resin material such as an acrylic resin (PMMA) or the like is filled into the mold 184. The knob main body 92 is formed due to the synthetic resin material, which has been filled-in in the mold 184, cooling and hardening.

In this way, the knob 162 is formed by, in a cap mounting step, the cap 107 being assembled to and fixed to the knob body 102 with which the knob main body 92 is integrally molded.

Here, at the knob 162 of the present shift lever device 160, the knob main body 92 is molded in a state in which the knob body 102 is disposed within the mold 184. Therefore, the knob main body 92 is already connected to the knob body 102 by molding. Thus, as compared with a case in which the knob body 102 and the knob main body 92 are completely independent, separate parts, a step for assembling the knob body 102 and the knob main body 92 together can substantially be eliminated, and therefore, the manufacturing cost of the knob 162 can be decreased.

Further, at the knob 162 which is formed in this way, the female screw portion 164 is molded as a portion of the knob body 102 at the time of molding the knob body 102. Thus, there is no need to separately employ a screw member corresponding to the female screw portion 164. In this way, the number of parts can be reduced, and from this standpoint as well, costs can be reduced.

If the female screw portion 164 is formed at the knob main body 92 and not at the knob body 102, the structure becomes simple. However, as compared with the acrylic resin or the like used for the knob main body 92, the nylon resin or the like used for the knob body 102 has excellent wear resistance and shock resistance. Thus, when screwing and assembling the female screw portion 164 of the knob 162 to the male screw 80A formed at the distal end of the lever member 80, breakage and the like of the female screw portion 164 can be effectively reduced, and the knob 162 can be assembled to the lever member 80 even without special attention being paid thereto.

In this way, the workability improves, and from this standpoint as well, the cost can be decreased.

As shown in FIG. 9, at the knob 162 of the present shift lever device 160, the top floor portion 168 is formed at the light guide 166. In this way, as compared with a structure in which the top floor portion 168 is not formed, the surface area of the end surface of the light guide 166, when the knob body 102 is viewed from above, is large.

Due to the light, which is taken-in at the light admitting surface 101 of the base portion 94, being led to the light guide 166, light is emitted at the end surface of the light guide 166. When the fact that this light passes through the cap 107 is taken into consideration, by forming the top floor portion 168 and enlarging the end surface of the light guide 166 as described above, the light-emitting surface area can be made to be large, and dispersion in the brightness of the light passing through the cap 107 can be made to be small.

Here, in a case in which the knob body 102 and the knob main body 92 are assembled together as completely independent, separate parts, the light guide 166 is inserted in from the open end at the lower side of the knob body 102, and the knob main body 92 is assembled to the knob body 102. In the case of such assembly, a hole of a size such that the female screw portion 164 can pass therethrough, and cut-outs of a size such that the connecting pieces 106 can pass therethrough, must be formed in the top end of the light guide 166. Not only is it not possible to form the top floor portion 168, but also, due to the formation of the cut-outs and the like, an increase in the surface area of the end surface of the light guide 166 cannot be achieved.

In contrast, at the knob 162 of the present shift lever device 160, the knob main body 92 is molded by so-called insert molding in which the knob body 102 is placed within the mold 184 as described above. Thus, molding of the top floor portion 168 is possible, and, as described above, the surface area of light emission can be made to be large, and as a result, dispersion in the brightness of the light transmitted through the cap 107 can be made to be small.

Structure of Third Embodiment

Figure 10:
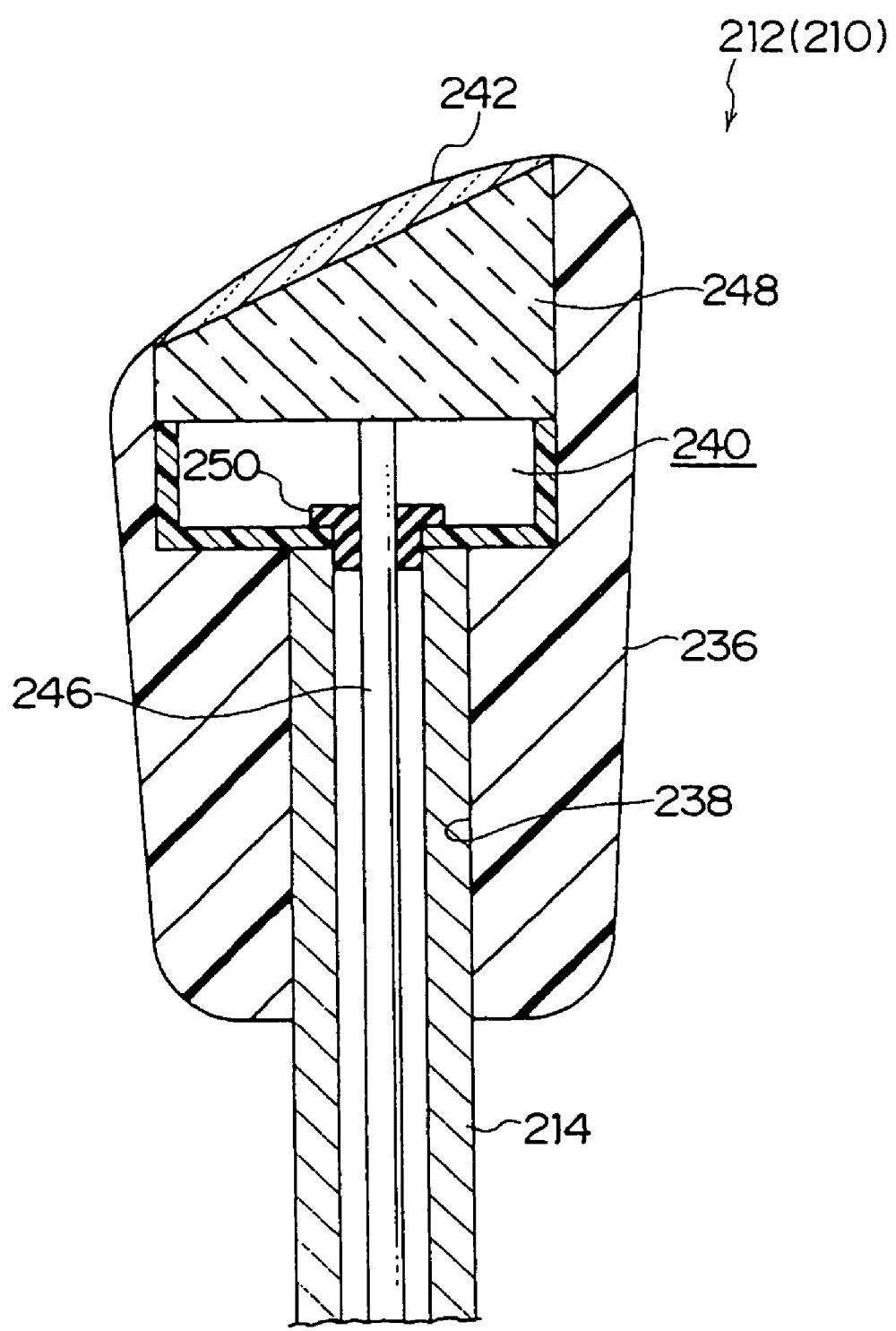
FIG. 10 is a sectional view of a knob of a shift lever device relating to a third embodiment of the present invention.

An enlarged perspective view of main portions of a shift lever device 210 relating to a third embodiment of the present invention is shown in FIG. 10.

As shown in this figure, the present shift lever device 210 has a shift lever 212. The shift lever 212 has a first lever 214 which serves as a lever main body and which is substantially shaped as a cylindrical tube whose longitudinal direction runs along a predetermined direction (e.g., substantially in the vertical direction of the vehicle).

The longitudinal direction proximal end portion of the first lever 214 is supported at a base member (not illustrated) so as to be freely turnable with, as the axial directions thereof, both a front-back direction, which is orthogonal to the longitudinal direction of the first lever 214, and a left-right direction, which is orthogonal to both the front-back direction and the longitudinal direction.

Note that, what are here called the "front-back direction" and the "left-right direction" are not directly related to the front and back, and the left and right, of the vehicle, and are merely directions used for the sake of convenience. Namely, if the present shift lever device 210 is set such that the longitudinal direction of the shift lever 212 is approximately along the vertical direction of the vehicle, the aforementioned front-back direction and left-right direction do substantially coincide with the front-back direction and the left-right direction of the vehicle. However, in a case in which the present shift lever device 210 is set, for example, at the instrument panel or the like of the vehicle, the longitudinal direction of the shift lever 212 is the front-back direction of the vehicle.

Figure 12:
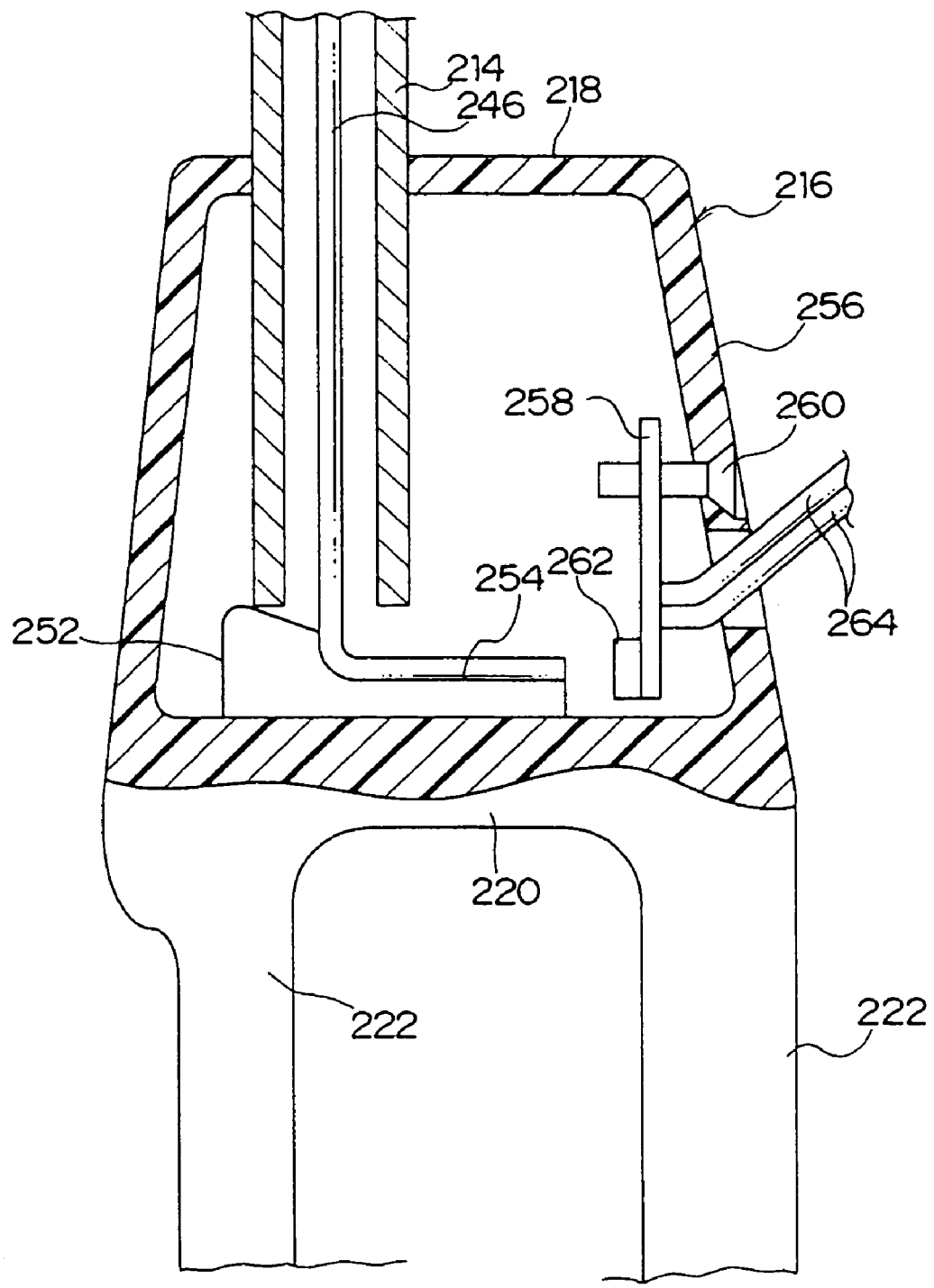
FIG. 12 is a sectional view of a proximal end side and neighboring portions thereof of a lever main body of the shift lever device relating to the third embodiment of the present invention.
Figure 13:
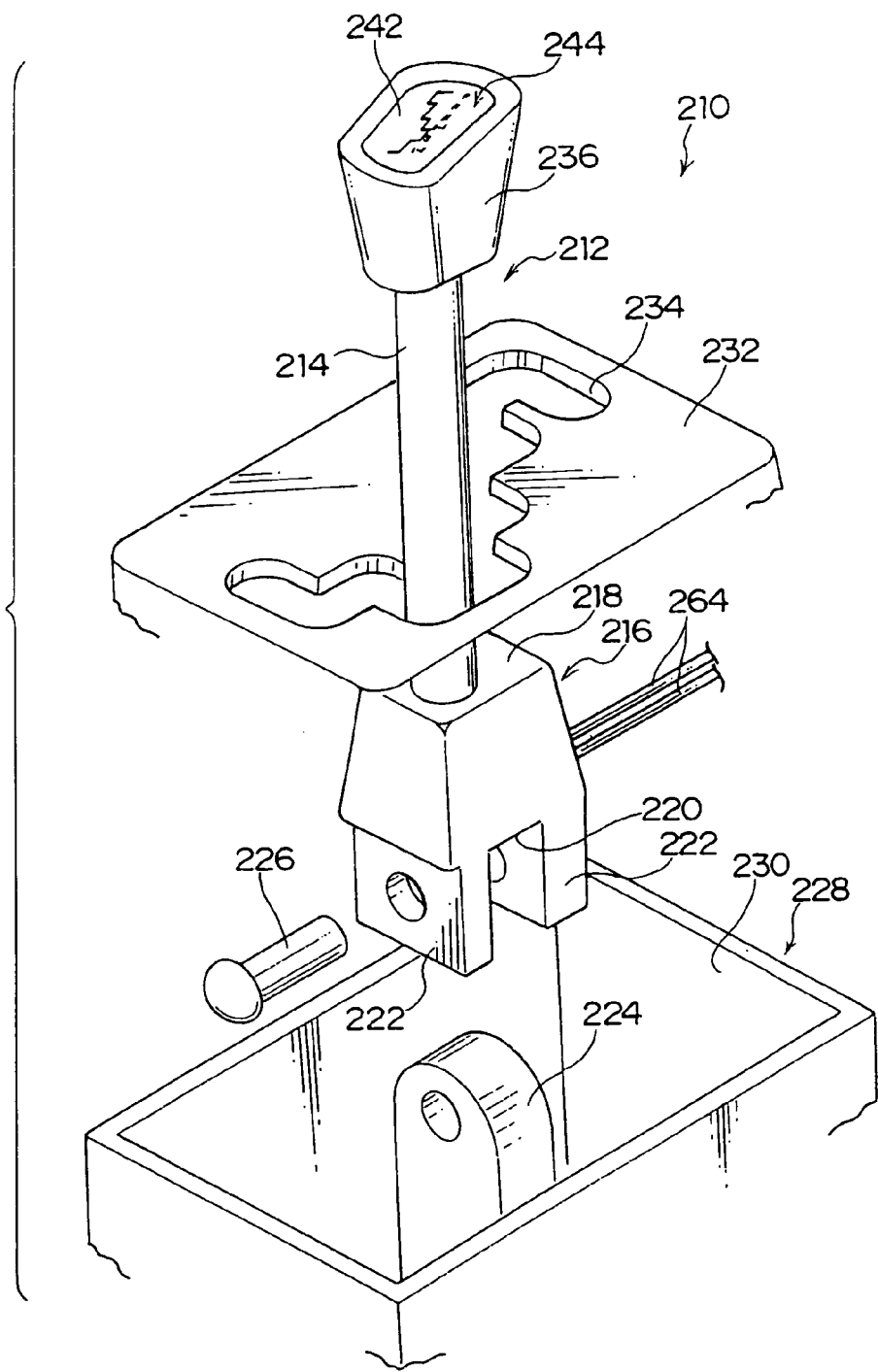
FIG. 13 is a schematic perspective view of a shift lever device relating to a fourth embodiment of the present invention.

A bracket 216 is provided at the longitudinal direction proximal end side of the first lever 214. As shown in FIG. 12, the interior of the bracket 216 is hollow. In a state in which the proximal end side of the first lever 214 passes through a top wall 218 of the bracket 216 and enters into the interior of the bracket 216, the first lever 214 is fixed integrally to the bracket 216 by a fixing means such as a fastening means like an unillustrated screw and bolt or the like.

On the other hand, a pair of vertical walls 222 extend from a floor wall 220 of the bracket 216. The vertical walls 222 oppose one another along the front-back direction. As shown in FIG. 10, the longitudinal direction distal end side of a second lever 224, which serves as a lever main body and is substantially rod-shaped, is set in between the vertical walls 222. A shaft 226 passes along the direction in which the vertical walls 22 oppose one another (i.e., the front-back direction), through the vertical walls 222 between which the distal end of the second lever 224 is set. In this way, the first lever 214 can be turned around the shaft 226 with respect to the second lever 224.

The longitudinal direction intermediate portion of the second lever 224 is supported at a side wall 230 of a base 228, so as to be turnable with the left-right direction being the axial direction. The base 228 is fixed to an appropriate position of the vehicle, e.g., between the driver's seat and the front passenger's seat if the present shift lever device 210 is disposed between the driver's seat and the front passenger's seat of the vehicle.

At the other end side of the second lever 224 which is further toward the other end than the longitudinal direction intermediate portion of the second lever 224, the second lever 224 is connected to the automatic transmission of the vehicle via a mechanical connecting means such as a wire cable or the like. When the control device of the automatic transmission detects that the second lever 224 has reached a predetermined turn position, the shift range is changed to the shift range which corresponds to the turn position of the second lever 224 among the plural shift ranges that are set in advance at the automatic transmission.

On the other hand, a housing 232 is disposed above the base 228. The respective members, which structure the present shift lever device 210 and which are disposed beneath the housing 232, are covered thereby.

A shift hole 234, which is formed in a zigzag shape which is bent appropriately to the front and the back and to the left and the right, is formed in the housing 232. The first lever 214 passes through the shift hole 234. The shift lever 212 is operated in a zigzag manner along the shift hole 234.

Note that, among the turn positions of the shift lever 212 which is shifted to the front and the back and to the left and the right in this way, the turn positions around the axis whose axial direction is the left-right direction can be detected by the automatic transmission due to the second lever 224 being connected to the automatic transmission by a mechanical connecting means such as a wire cable or the like as described above.

In contrast, the turn positions of the shift lever 212 around the axis whose axial direction is the front-back direction, i.e., the turn positions of the first lever 214 around the shaft 226, are detected by a detecting means such as a microswitch or the like which is provided at the side wall 230 of the base 228 or the like. On the basis of the conducting state of the detecting means or on the basis of a signal outputted from the detecting means, the control device of the automatic transmission detects the turn position.

On the other hand, as shown in FIG. 10, a knob 236 for grasping is provided at the distal end of the first lever 214. As shown in FIG. 10, the knob 236 is molded of a synthetic resin material, and a pass through hole 238 for insertion of the first lever 214 is formed in the lower end portion of the knob 236. The distal end side of the first lever 214 enters into the pass through hole 238 from the lower side open end thereof.

The first lever 214, which is set in the pass through hole 238, is fixed integrally to the knob 236. Note that the fixing together of the first lever 214 and the knob 236 is not particularly limited. Accordingly, fastening-fixing by a fastening means such as a screw or the like, or adhesion-fixing by an adhering means such as an adhesive or the like, or press-fitting or the like of the first lever 214 into the pass through hole 238 may be used. Or, this fixing may be carried out by forming a female screw in the outer peripheral portion of the distal end side of the first lever 214 and a male screw at the inner peripheral portion of the pass through hole 238, and screwing the first lever 214 and the knob 236 together.

A lamp house 240 is formed in the knob 236. The lamp house 240 is a space which is formed in a substantial U shape which opens at the top end of the knob 236. The top end of the pass through hole 238 opens at the floor portion of the lamp house 240.

An indicator 242, which serves as a transmitting portion, is mounted to the top side open end of the lamp house 240. The indicator 242 is a plate-shaped member which is transparent or is semitransparent or is colored to a desired color such that light can pass therethrough. The indicator 242 is fixed integrally to the knob 236 in a state of closing the top side open end of lamp house 240, by so-called snap fitting or heat adhesion, or by adhesion by an adhesive or the like.

Figure 11:
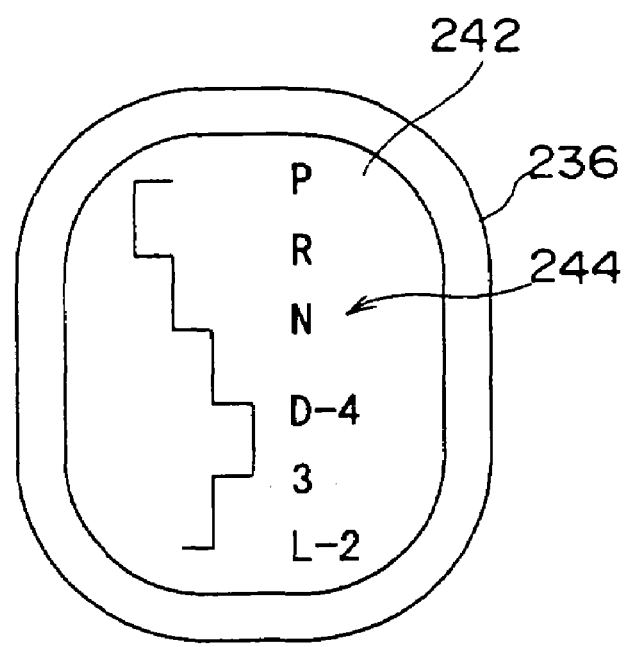
FIG. 11 is a plan view of the knob of the shift lever device relating to the third embodiment of the present invention.

As shown in FIG. 11, a shift pattern 244, which serves as an operation pattern and is structured by a line which has substantially the same configuration as the shift hole 234 and by letters and numbers positions at a side of this line, is formed on the surface of the indicator 242. At the shift pattern 244, the line which has substantially the same configuration as the shift hole 234 indicates the operation direction of the shift lever 212, and the letters and numbers positioned at the side of the line indicate the shift ranges.

Further, as shown in FIG. 10, an optical fiber 246 serving as a light guiding means is provided at the interior of the lamp house 240. As is conventionally known, the optical fiber 246 is a string-shaped member formed of glass or the like, and can transmit light from the longitudinal direction proximal end side thereof to the distal end side thereof.

A light guide 248 serving as the light guiding means is fixed integrally to the longitudinal direction distal end portion of the optical fiber 246. The light guide 248 is fixed to the reverse surface of the indicator 242 at the interior of the lamp house 240. Light, which is sent from the longitudinal direction proximal end side to the distal end of the optical fiber 246 which serves as an illuminating means, passes through the light guide 248 and then passes through the indicator 242.

The proximal end side of the optical fiber 246 passes through the interior of a ring-shaped rubber vibration isolator 250 which is fit in the top side open end of the pass through hole 238. Further, the proximal end side of the optical fiber 246 passes through the pass through hole 238 and the interior of the first lever 214, and, as shown in FIG. 12, enters into the bracket 216 from the proximal end portion of the first lever 214.

A guide member 252 is disposed on the floor portion of the bracket 216 in correspondence with the optical fiber 246 which has entered into the bracket 216. A guide surface 254, which is substantially right-angled and whose corner portion is curved in an arc-shape, is formed at a portion of the guide member 252. The optical fiber 246, which has entered into the bracket 216 from the first lever 214, is guided by the guide surface 254 of the guide member 252, and is guided toward a side wall 256 of the bracket 216.

A base plate 258 is disposed at the side of the proximal end portion of the optical fiber 246. The base plate 258 stands upright on the floor portion of the bracket 216 in a state in which one surface in the direction of thickness of the base plate 258 faces the proximal end portion of the optical fiber 246. The distal end side of the base plate 258 is fixed, from the outer side of the side wall 256 of the bracket 216, by a screw 260 which passes through the side wall 256.

An LED 262, which structures an illuminating means serving as a light-emitting means, is provided at one surface in the direction of thickness of the base plate 258 (the surface at the side of the proximal end portion of the optical fiber 246). Unillustrated electronic parts, such as resistor elements, transistors, and the like are provided at one of the surfaces of the base plate 258 in the direction of thickness thereof, so as to structure a circuit.

The distal ends of two cords 264 are fixed to the other surface of the base plate 258 in the direction of thickness thereof. The both cords 264 are electrically connected to the circuit on the base plate 258. In contrast, the proximal end sides of the cords 264 pass through the side wall 256 and extend to the exterior of the bracket 216, and are connected, via an unillustrated control means such as an ECU or the like, to the battery installed in the vehicle. (Note that these members to which reference numerals are not given are not illustrated in the drawings.) For example, the ECU is connected to a headlight switch of the vehicle for external illumination, and when the headlight switch is operated in order to turn on the vehicle position lamps or headlights, the ECU causes electric current to flow to the circuit of the base plate 258 via the cords 264.

<Operation and Effects of the Third Embodiment>

In the present shift lever device 210, the knob 236 is grasped by a vehicle occupant, and in this state, the shift lever 212 is turned along the shift hole 234 around an axis whose axial direction is the left-right direction or the front-back direction. When the first lever 214 reaches a predetermined position in the shift hole 234, the control means of the automatic transmission switches from the shift range until then to the shift range corresponding to the turn position of the shift lever 212.

On the other hand, when, at night or the like, the vehicle occupant operates the headlight switch so as to light the headlights or the vehicle position lamps, usually, accompanying this, the meters provided on the instrument panel are illuminated. In this way, even if it is dark in the vehicle cabin, the meters can easily be confirmed visually.

Further, in this way, when the headlight switch is operated in order to light the headlights or the vehicle position lamps, the ECU connected to the headlight switch causes current to flow via the cords 264 to the electrical circuit of the base plate 258. When current flows to the circuit of the base plate 258, the LED 262 emits light. Because the LED 262 faces the proximal end portion of the optical fiber 246, the light emitted from the LED 262 passes from the proximal end portion of the optical fiber 246 through the optical fiber 246, and heads toward the distal end side thereof. The light, which has passed through the optical fiber 246 and headed toward the distal end side thereof, is transmitted through the light guide 248 provided at the distal end portion of the optical fiber 246, and the light passes through from the reverse surface side of the indicator 242 to the obverse side thereof.

In this way, due to the light passing through from the reverse surface side of the indicator 242 to the obverse side thereof, the top surface of the knob 236 emits light. The shift pattern 244 formed on the indicator 242 can thereby easily be visually confirmed even if the interior of the vehicle cabin is dark.

Further, the present embodiment is structured such that the light emitted by the LED 262 passes through the optical fiber 246 and passes through the indicator 242. Due to the base plate 258, at which the LED 262 is provided, being mounted within the bracket 216, basically no relative displacement arises between the LED 262 and the optical fiber 246 even when the shift lever 212 is operated.

Thus, even if the shift lever 212 is operated, the LED 262 and the proximal end portion of the optical fiber 246 certainly oppose one another. Accordingly, regardless of what turn position the shift lever 212 is at, the amount of light which is emitted by the LED 262 and reaches the proximal end portion of the optical fiber 246 does not change. In this way, the luminance at the indicator 242 can be made to be constant regardless of the turn position of the shift lever 212.

Structure of Fourth Embodiment

Next, a fourth embodiment of the present invention will be described. Note that, in the description of the following respective embodiments including the fourth embodiment, regions which are basically the same as those of the above-described third embodiment are denoted by the same reference numerals, and detailed description thereof is omitted.

Figure 14:
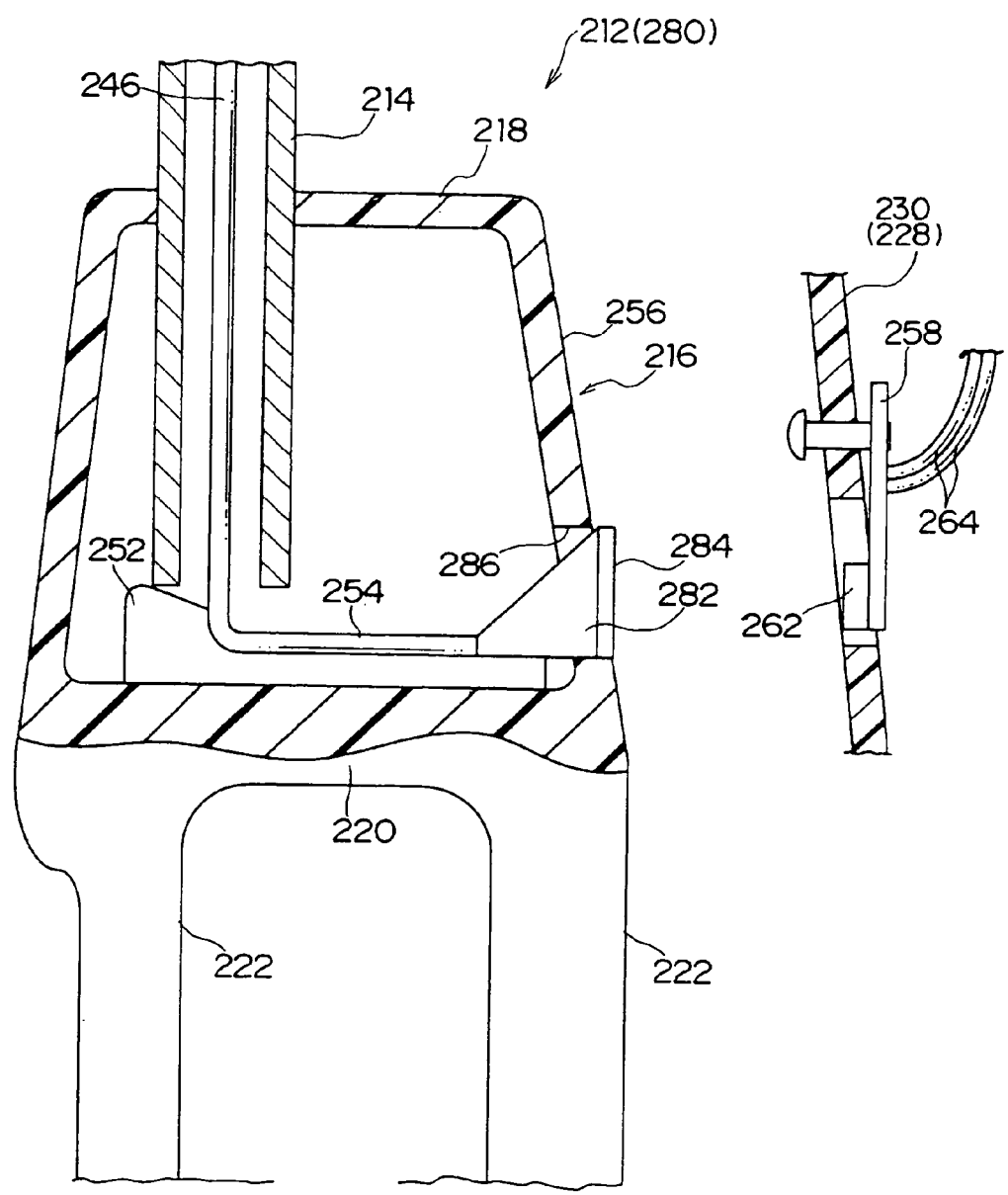
FIG. 14 is a sectional view, corresponding to FIG. 8, of the shift lever device relating to the fourth embodiment of the present invention.

The structure of main portions of a shift lever device 280 relating to a fourth embodiment of the present invention is shown in FIG. 14 in a sectional view corresponding to FIG. 12.

As shown in FIG. 14, at the present shift lever device 280, differently than the shift lever device 210 relating to the third embodiment, the base plate 258 is not provided within the bracket 216, but is fixed integrally to the side wall 230 of the base 228 at the outer side of the side wall 256 of the bracket 216.

Further, in the present shift lever device 280, a light guide 282, which serves as a light collecting means and the light guiding means, is provided in the bracket 216. The light guide 282 is formed of glass or the like substantially in the shape of a quadrangular pyramid which gradually tapers from the floor portion side toward the apex side thereof. The floor surface of the light guide 282 is a light collecting surface 284. The light illuminated onto the light collecting surface 284 heads toward the apex portion side while being refracted within the light guide 282, and is emitted from the apex portion.

The apex portion of the light guide 282 faces the proximal end portion of the optical fiber 246. The light, which has passed through the interior of the light guide 282 and is emitted from the apex portion, heads toward the proximal end portion of the optical fiber 246. The light collecting surface 284 side of the light guide 282 passes through an opening 86 formed in the side wall 256, and projects out to the exterior of the bracket 216, and faces the LED 262 which is mounted to the base plate 258. Here, the light collecting surface 284 of the light guide 282 has at least a width which faces the LED 262 even in the states in which the shift lever 212 is turned in the frontback direction and in the left-right direction.

<Operation and Effects of the Fourth Embodiment>

In this way, the present shift lever device 280 differs from the shift lever device 210 relating to the above-described third embodiment in that the base plate 258 is mounted to the base 228. Therefore, by turning the shift lever 212, the proximal end portion of the optical fiber 246 approaches or moves away from the LED 262 to the front, back, left or right. However, even if the shift lever 212 is turned, the light collecting surface 284 of the light guide 282 mounted to the bracket 216 faces the LED 262 regardless of the turn position the shift lever 212 is at.

Thus, regardless of the turn position of the shift lever 212, the light emitted by the LED 262 reaches the light collecting surface 284 of the light guide 282. In this way, the light which has reached the light collecting surface 284 passes through the interior of the light guide 282, is emitted from the apex portion thereof, and heads toward the proximal end portion of the optical fiber 246. The light which reaches the proximal end portion of the optical fiber 246 passes through the interior of the optical fiber 246.

As described above, in the present shift lever device 280, although the base plate 258 is mounted to the base 228, the light emitted from the LED 262 can be sent to the optical fiber 246. Thus, in the same way as in the above-described third embodiment, the top surface of the knob 236 can be made to emit light, and as a result, the shift pattern 244 formed at the indicator 242 can easily be visually confirmed even if the interior of the vehicle cabin is dark.

Further, in the present embodiment, because the base plate 258 is mounted to the base 228, even if the shift lever 212 is turned, the base plate 258 and the cords 264 do not move. Therefore, transmission, to the base plate 258, of vibration or shock caused by the turning of the shift lever 212 can be prevented or decreased, and there is no need to improve the vibration resistance and the shock resistance of the base plate 258 more than needed.

As described above, because the cords 264 do not move even if the shift lever 212 is turned, there is no need to bend or flex the cords 264 in advance between the base 228 and the bracket 216. In this way, it is not necessary to improve the bendability of the cords 264 more than needed.

Fifth Embodiment

Next, a fifth embodiment of the present invention will be described.

Figure 15:
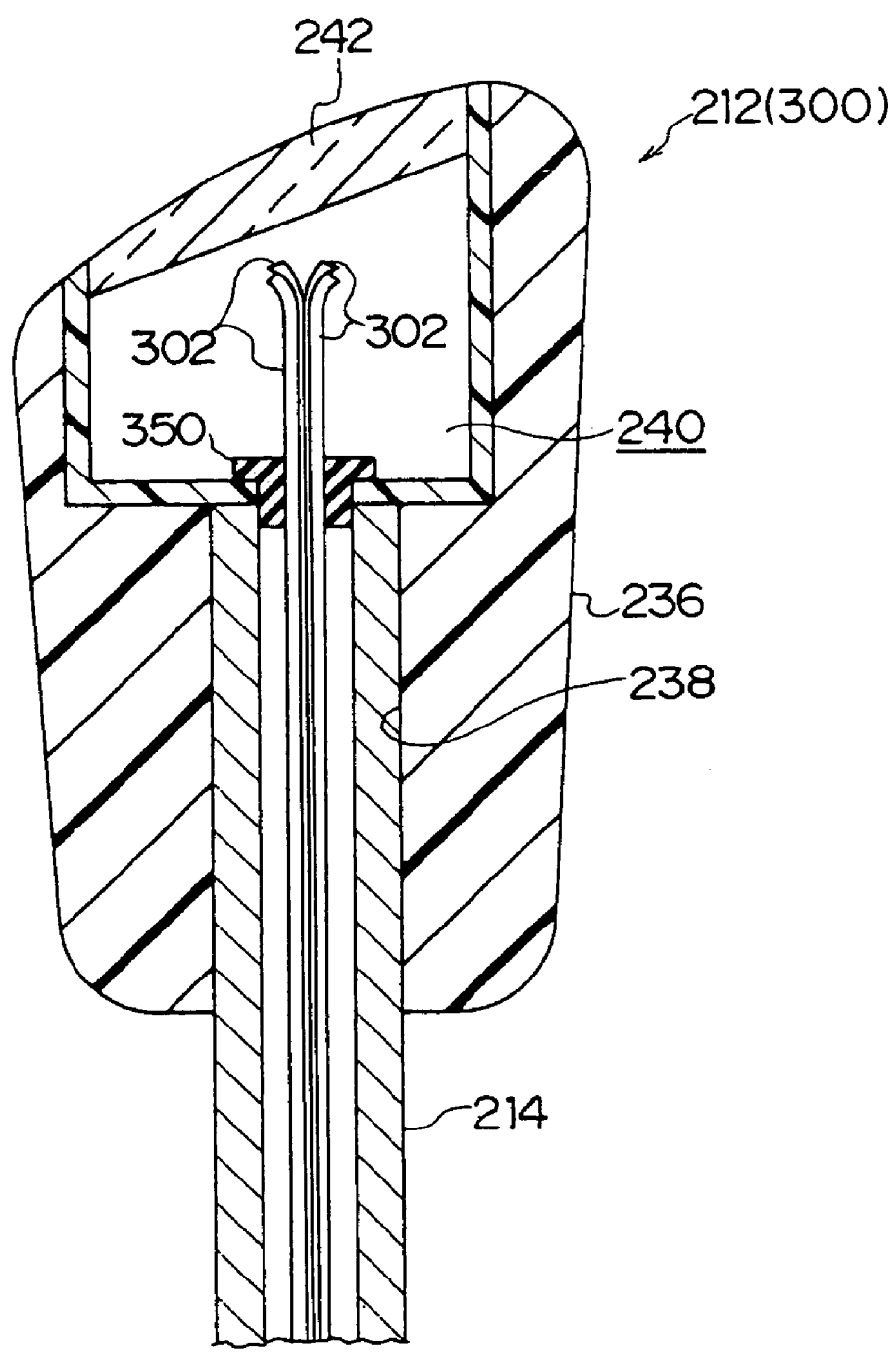
FIG. 15 is a sectional view, corresponding to FIG. 6, of a shift lever device relating to a fifth embodiment of the present invention.

In FIG. 15, the main portions of a shift lever device 300 relating to the present embodiment are shown in a sectional view corresponding to FIG. 10.

As shown in FIG. 15, in the present shift lever device 300, in place of the optical fiber 246 used in the first and fourth embodiments, a plurality of optical fibers 302, which serve as light guiding means and whose outer diameters are sufficiently smaller (i.e., narrower) than that of the optical fiber 246, are provided.

In the same way as the optical fiber 246 used in the above-described fourth embodiment, the distal end sides of these optical fibers 302 are positioned within the lamp house 240, and the proximal end sides pass through the pass through hole 238 and the interior of the first lever 214, and are bent within the bracket 216, and the proximal end portions face the apex portion of the light guide 282.

However, in the present embodiment, the light guide 248 is not provided at the distal end portions of the optical fibers 302.

Moreover, although the distal end portions of the optical fibers 302 approximately face the indicator 242, they are directed in respectively different directions. The lights passing through the respective optical fibers 302 and reaching the distal end portions thereof are emitted overall in a substantially radial manner in respectively different directions.

In this way, in the present embodiment, due to the distal end portions of the respective optical fibers 302 being directed in respectively different directions, the light is, on the whole, diffused and emitted substantially radially. In this way, light is illuminated over a broad range toward the reverse surface of the indicator 242. Thus, non-uniformity of the luminance at the indicator 242 is reduced.

As described above, in the shift lever device relating to the present invention, light is led to the interior of a knob from a light source which is provided at the exterior of the knob. Therefore, even if an illuminating means such as a light bulb or an LED or the like is not provided at the interior of the knob, light can be emitted from the interior of the knob. In this way, the shift pattern and the shift position can be easily confirmed without the structure of the knob being complex or the knob being made to be large.

What is claimed is:

1. A shift lever device for operation of a transmission of a vehicle having a plurality of shift ranges, the shift lever device comprising:

a lever main body for shifting having a proximal end side, and a distal end side which has shift positions corresponding to the respective shift ranges;

a housing movably supporting the proximal end side of the lever main body one of directly and indirectly;

a light source provided one of directly and indirectly at one of the housing and the lever main body;

a knob mounted to a distal end portion of the lever main body, and having a transmitting portion through which light can be transmitted, and transmitting light, which has been guided to an interior of the knob from the transmitting portion, to an exterior of the knob;

a light guiding portion provided at one or both of the knob and the lever main body, and guiding light from the light source to the interior of the knob; and a light guiding control portion including a shutter member operatively connected to and moving with the lever main body, and a light guide between the light source and the shutter member, wherein said shutter does not block light from the light guide to the knob transmitting portion when the lever main body is positioned at least at one specific shift position, and which, when the lever main body is positioned at a position other than the specific shift position, is moved by the lever main body to a position blocking the light from the light guide to the knob transmitting portion.

2. The shift lever device of claim 1, wherein the knob has a knob main body that includes all of the light guiding portion, and a light blocking portion provided integrally with an outer portion of the knob main body.

3. The shift lever device of claim 2, wherein
the light source is positioned at said distal end side of the lever main body and in a vicinity of an exterior surface of the light guiding portion of the knob main body.

4. The shift lever device of claim 2, wherein
the light blocking portion has a hollow tube-shaped body,
a fixed portion, which can be fixed to the distal end portion of the lever main body, and a plurality of connecting pieces, which connect the fixed portion and the light blocking portion, are provided within the tube-shaped body, and the light blocking portion and the connecting pieces and the fixed portion are integrally molded of a same resin material.

5. The shift lever device of claim 4, wherein the knob is formed integrally from the light blocking portion and the knob main body, by a semi-manufactured product, which is obtained by molding one of the light blocking portion and the knob main body, being set and insert molded in a mold for manufacture of another of the light blocking portion and the knob main body.

6. The shift lever device of claim 5, wherein
the fixed portion has an opening into which the distal end portion of the lever main body enters at a time of mounting the knob to the distal end portion of the lever main body, and
the knob main body covers at least a portion of an end surface of the fixed portion which faces the transmitting portion.

7. The shift lever device of claim 4, wherein
the fixed portion has a female screw,
the lever main body has a male screw, and
the fixed portion and the lever main body are fixed and connected to one another by screwing-together of the female screw and the male screw.

8. The shift lever device of claim 1, wherein
the lever main body has a hollow tube-shaped body having a proximal end and a distal end,
the light source is provided at a side of a proximal end side of the lever main body, and
the light guiding portion, which guides the light from the light source, passes through an interior of the tube-shaped body of the lever main body.

9. The shift lever device of claim 8, wherein the light source is provided integrally at the proximal end side of the lever main body.

10. The shift lever device of claim 8, further comprising a light collecting portion provided on an optical path connecting the light guiding portion and the light source, and having a light collecting surface facing the light source and a light emitting surface facing an end portion of the light guiding portion,
wherein the light collecting surface of the light collecting portion has a surface dimension of an extent such that uniform light from the light source can be received even if the light collecting surface and the light source are displaced relatively in a direction traversing the optical path due to a change in the shift position of the lever main body.

11. A shift lever device for operation of a transmission of a vehicle having a plurality of shift ranges, the shift lever device comprising:
a lever main body for shifting having a proximal end side, and a distal end side which has shift positions corresponding to the respective shift ranges;
a housing movably supporting the proximal end side of the lever main body one of directly and indirectly;
a light source positioned at said distal end side of the lever main body;
a knob mounted to a distal end portion of the lever main body, and having a transmitting portion through which light can be transmitted, and transmitting light, which has been guided to an interior of the knob from the transmitting portion, to an exterior of the knob
a light guiding portion provided at the knob, and guiding light from the light source to the interior of the knob; and
a light guiding control portion including a shutter member operatively connected to and moving with the lever main body which, when the lever main body is positioned at least at one specific shift position, does not block light from the light source to the knob transmitting portion, and which, when the lever main body is positioned at a position other than the specific shift position, is moved by the lever main body to a position blocking the light to the knob transmitting portion, and further including a light guide disposed between the light source and the shutter member, wherein the knob has a knob main body that includes all of the light guiding portion, and a light blocking portion provided integrally with an outer portion of the knob main body, and the light source is in a vicinity of an exterior surface of the light guiding portion of the knob main body.

12. The shift lever device of claim 11, wherein the shutter member includes a light conducting aperture and a light blocking wall, and wherein one end of said light guide is aligned with said aperture when said shutter member is in said non-blocking position, and wherein said one end of said light guide is aligned with said light blocking wall when said shutter member is moved to said blocking position.

* * * * *